(12) United States Patent
Fujii et al.

(10) Patent No.: US 6,392,690 B1
(45) Date of Patent: May 21, 2002

(54) THREE-DIMENSIONAL IMAGE DISPLAY DEVICE

(75) Inventors: Akiyoshi Fujii; Hiroshi Hamada, both of Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/122,859

(22) Filed: Jul. 28, 1998

(30) Foreign Application Priority Data

Aug. 29, 1997 (JP) .............................................. 9-235173

(51) Int. Cl.⁷ ................................................. H04N 9/47
(52) U.S. Cl. ................................ 348/59; 348/51; 345/6
(58) Field of Search ............................ 348/42, 51, 54, 348/55, 59, 61, 115, 169, 52, 39, 40; 345/7, 9, 10, 6; 359/458, 462, 463

(56) References Cited

U.S. PATENT DOCUMENTS

| | | | | | |
|---|---|---|---|---|---|
| 5,493,427 A | * | 2/1996 | Nomura et al. | ............... | 348/59 |
| 5,771,066 A | * | 6/1998 | Barnea | ........................ | 348/59 |
| 5,930,037 A | * | 7/1999 | Imai | ............................ | 359/463 |
| 5,959,664 A | * | 9/1999 | Woodgate | ..................... | 348/59 |
| 5,966,167 A | * | 10/1999 | Nose et al. | .................... | 348/59 |

FOREIGN PATENT DOCUMENTS

| JP | 44995/1990 | 2/1990 |
|---|---|---|
| JP | 146346/1996 | 6/1996 |

* cited by examiner

Primary Examiner—Nhon Diep
Assistant Examiner—Gims Philippe
(74) Attorney, Agent, or Firm—Nixon & Vanderhye P.C.

(57) ABSTRACT

In a 3-D image display device, a parallax barrier having a plurality of apertures is provided in front of an LCD element. Each aperture is equipped with a color filter of any one of red, green, and blue colors. The LCD element conducts monochromatic display, and hence, no color filters are provided therein. In the LCD element, regarding each color, a pixel group is provided at each position corresponding to the color filter of the color, the pixel group being composed of a plurality of pixels which are driven in response to an image signal corresponding to the color. With this arrangement, when the number of parallax images for a 3-D image is increased so that a fine 3-D image is obtained, the yield of the display element, and further, the yield of the 3-D image display device, can be improved. Besides, the cost of the device can be lowered.

20 Claims, 22 Drawing Sheets

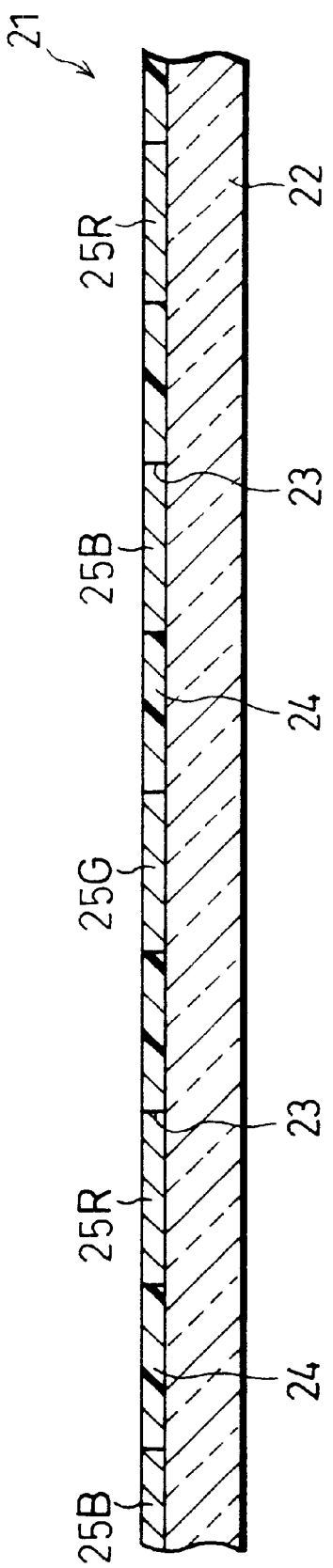

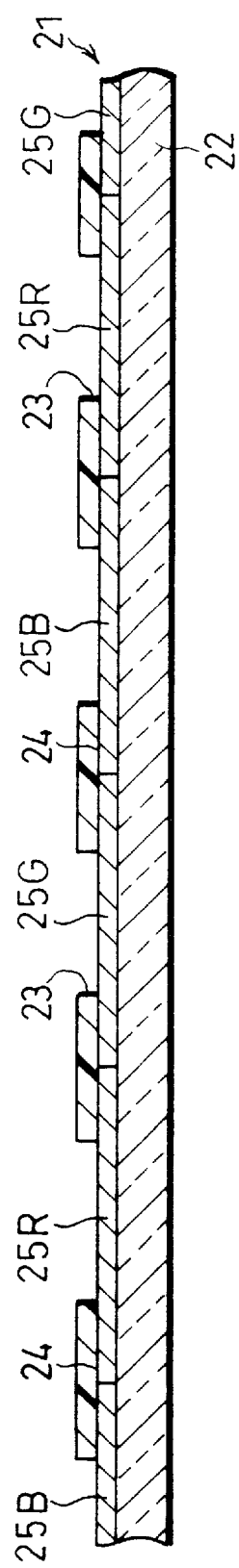

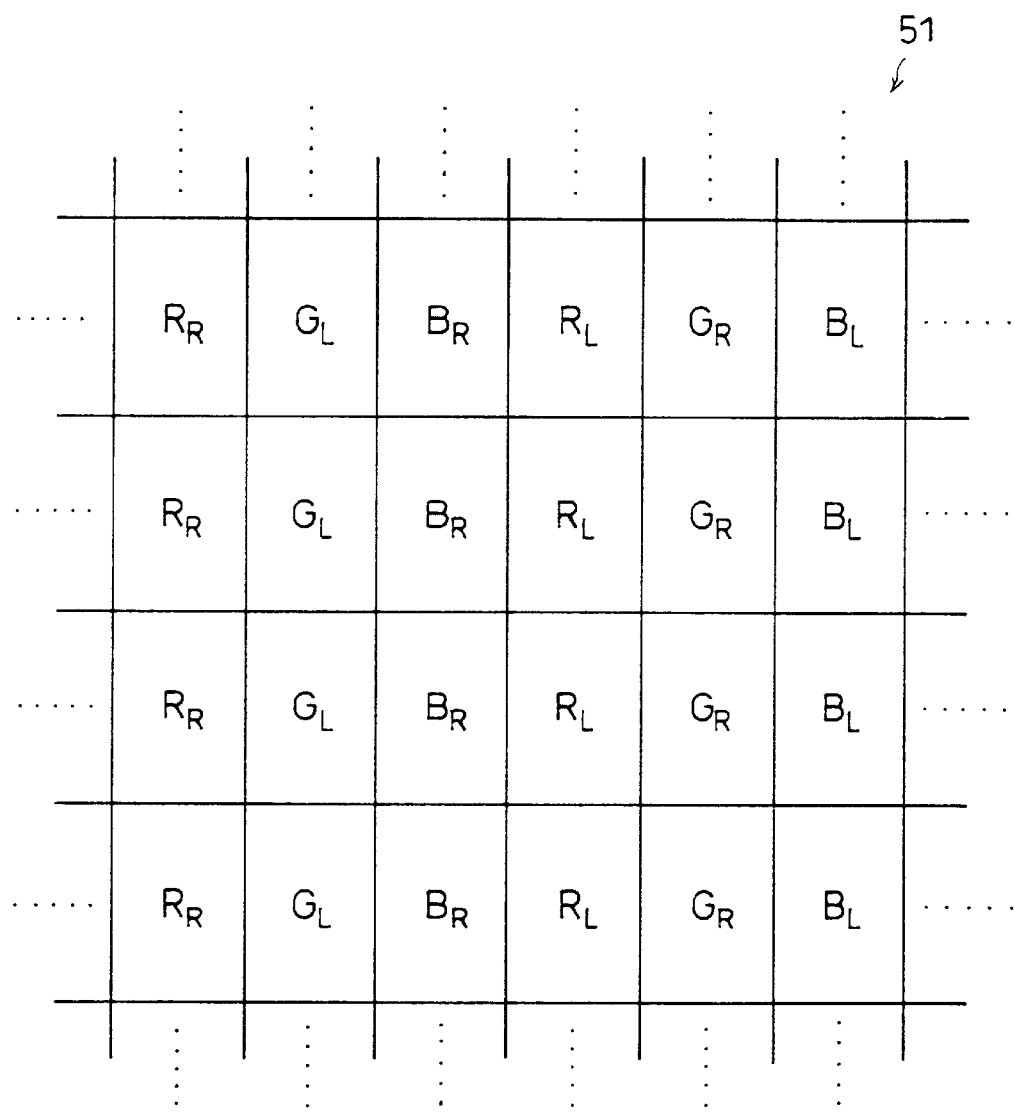
F I G. 20

THREE-DIMENSIONAL IMAGE DISPLAY DEVICE

FIELD OF THE INVENTION

The present invention relates to a three-dimensional image display device for displaying three-dimensional images which an observer can observe without special glasses.

BACKGROUND OF THE INVENTION

Conventionally, a three-dimensional image display device for displaying three-dimensional images has been used in many ways, for example, for game machines which are provided in amusement arcades, three-dimensional monitors, CAD (computer aided design), and medical instruments.

Generally, an observer can attain a three-dimensional view of an object based on displayed object images, if the object images have parallax therebetween which corresponds to a distance between the observer's eyes (such images are hereinafter referred to as parallax images) and they are made to be seen by the eyes respectively. The following are typical methods for directing the parallax images to the observer's right and left eyes respectively, which are applied to three-dimensional image display devices for displaying images based on the foregoing principal.

1. Shutter glasses method: Parallax images for the right eye and those for the left eye are alternately displayed by switching, and the observer is made to wear shutter glasses in which states of right and left shutters are switched in synchronization with the switching of the parallax images. Thus, by this shutter glasses method, parallax images are directed to the observer's right and left eyes by the switching operation of the shutter glasses.

2. Polarizing glasses method: Polarizing plates having light polarization directions crossing one another are provided before an image for the left eye and that for the right eye, respectively, and the observer is made to wear glasses in which, likewise, polarizing plates having light polarization directions crossing one another are provided so as to come before the right and left eyes respectively. By doing so, parallax images are directed to the observer's right and left eyes respectively.

3. Parallax barrier method, or lenticular lens method: By providing in front of a display element, a parallax barrier with a plurality of apertures (slits), or a lenticular lens composed of cylindrical lenses provided so as to form a plane surface, an image observation space is formed in front of the parallax barrier or the lenticular lens. The observer is made to observe images with his/her eyes positioned in the space. The following description will explain in detail a three-dimensional image display device to which the parallax barrier method or the lenticular lens method of the foregoing item 3 is applied.

FIG. 14 illustrates a cross section of a three-dimensional (3-D) image display device 50 in which a parallax barrier 71 is installed before a liquid crystal display (LCD) element 51.

As shown in FIG. 15, the LCD element 51 has a TFT substrate 52 and a counter substrate 53, which both are made of glass, and liquid crystal 57 is cramped therebetween. On the TFT substrate 52, TFTs (thin film transistors), not shown, as active elements and pixel electrodes 54 are provided in a matrix form. On the other hand, on the counter substrate 53, there are provided a color filter 55 composed of filters of three colors, red (R), green (G), and blue (B) which are formed at the same pitch as that for the TFTS, and transparent electrodes 56 made of, for example, ITO (indium tin oxide). The LCD element 51 of this type is formed as an active-matrix-type color liquid crystal panel.

Between individual filters of the color filter 55, a black matrix 58 for blocking light with respect to the TFTs and separating individual pixels from one another is formed. The black matrix 58 is normally formed by forming a chrome oxide/metal chrome thin film on the counter substrate 53 and etching the thin film to a desired pattern by the photolithography technique. Therefore, accuracy is required in determining positions of the color filter 53 and the black matrix 58.

Further, on the color filter 55, a transparent color filter protection film 59 is provided, which cancels level differences in the color filter 55 to form a flat surface and prevents electrodes from breaking down. Moreover, alignment films 60 and 61 are provided on surfaces of the TFT substrate 52 and the counter substrate 53 on their sides to the liquid crystal 57, respectively, so that their alignment directions cross each other, for example. On outside surfaces of the TFT substrate 52 and the counter substrate 53 (opposite surfaces thereof to the surfaces on the sides to the liquid crystal 57), there are provided linearly polarizing plates 62 and 63 (see FIG. 14), respectively. Further, on an outside surface of the linearly polarizing plate 62, a backlight, not shown, is provided.

As shown in FIG. 14, a plurality of pixel groups 64, each of which is composed of n pixels, are formed in the LCD element 51. Pixels in the pixel group 64 are arranged as follows:

(R1, G2, B3, . . . Rn), (G1, B2, R3, . . . Gn), (B1, R2, G3, . . . Bn), . . .

where (i) pixels in a pair of parentheses belongs to the same one pixel group 64, (ii) R, G, and B respectively represent pixels which are driven by color signals corresponding to the red color, the green color, and the blue color, and (iii) numerals 1 through n indicate correspondence to parallax images 1 through n, respectively. Thus, the pixels for displaying the parallax images are arranged in an order of R→G→B.

Incidentally, n parallax images are n images obtained when viewing an object from n different directions. Such a device wherein n parallax images are used is generally called as multi-view device.

On the other hand, the parallax barrier 71 has a plurality of slits serving as apertures 72 and light blocking sections 73, as shown in FIG. 14. The parallax barrier is disposed in front of the LCD element 51 so that the apertures 72 correspond to the pixel groups 64 of the LCD element 51 at 1:1 ratio.

Light going out from each pixel of the LCD element 51 normally outgoes in all directions from the LCD element 51, but with the foregoing arrangement, lights outgoing from pixels belonging to the same pixel group 64 pass through the same aperture 72, going along optical paths shown by arrows in FIG. 14.

Then, as shown in FIG. 16, observation regions E1, E2, . . . En at which images of "1" to "n" are observed, respectively, are formed in front of the 3-D image display device 50, by dividing a space there. As a result, in the case where the observer's eye is placed, for example, in the observation region E1, the observer can observe all the images of "1" displayed by the LCD element 51. Thus, by placing the eyes in two regions among the observation regions E1, E2, . . . and En, respectively, the observer facing the LCD element 51 with the parallax barrier 71 therebetween selects two among the images of "1" to "n," thereby observing 3-D images. In other words, the observer is allowed to observe various 3-D images depending on viewing angles (positions of the eyes).

On the other hand, FIG. 17 shows a cross section of a 3-D image display device 50 wherein a lenticular lens 81 is provided in front of an LCD element 51. The lenticular lens 81 is composed of a plurality of cylindrical lenses 82 arrayed on a substrate 83 so that the pixel groups 64 of the LCD element 51 and the cylindrical lenses 82 correspond to each other at 1:1 ratio. Therefore, when the observer observes display through the lenticular lens 81, images are selectively viewed depending on the direction of viewing, due to the functions of the cylindrical lenses 82.

For example, in the case where the observer is at a imposition in the same direction with respect to the display as the direction (shown by a solid line arrow in FIG. 17) in which light outgoing from a pixel for displaying an image obtained by viewing an object in a direction of "1" (such a pixel is hereinafter referred to as pixel 1) goes so as to pass through a principal point of the cylindrical lens 82, the observer consequently views only an image of the pixel 1, which is displayed only in a region shown by broken lines. Thus, by providing the lenticular lens 81 in front of the LCD element 51, the same effect as that when the parallax barrier 71 is used can be achieved.

Incidentally, regarding the parallax barrier method, or the lenticular lens method, it is necessary to set the pitch of the apertures 72 of the parallax barrier 71 or the pitch of the cylindrical lenses 82, with high precision, so that all the pixels can be viewed from one point of view of the observer. To state differently, the pitch is set with high precision so that all the images of, for example, the pixel 1 can be observed from one point in front of the 3-D image display device 50.

Here, let the pixel pitch of the LCD element 51 be P, a method for the 3-D display be the multi-view method, and a distance between the LCD element 51 and either the parallax barrier 71 or the lenticular lens 81 be d, a pitch p of the apertures 72 or the cylindrical lenses 82 when a display surface (a surface of the parallax barrier 71 or the lenticular lens 81) is observed at a distance therefrom is expressed as:

$$p = L \cdot n \cdot P / (d + L) \quad (1)$$

Thus, the pitch p of the apertures 72 or the cylindrical lenses 82 has to be set with high precision, so as to satisfy the above formula (1). By doing so, the observation regions E1, E2, . . . En at which n parallax images are observed respectively are formed in front of the 3-D image display device 50 as shown in FIG. 16, thereby allowing the observer to see all the pixels.

Incidentally, as shown in FIG. 16, the observation regions E1, E2, . . . En have a substantially rhombus-shape cross section each. This is because light outgoing from each pixel of the LCD element 51, passing through the parallax barrier 71 or the lenticular lens 81, goes radially. Such lights are composited at a distance L from the display surface, thereby forming the observation regions E1, E2, . . . En in a substantially rhombus-shape cross section each.

A position of the parallax barrier 71 or the lenticular lens 81 with respect to the LCD element 51 may be determined in the following manner.

A maximum width of each of the observation regions E1, E2, . . . En is usually set to an average distance between the observer's eyes, that is, 65 mm. Let the width be E, and relationship expressed by the following formula is satisfied:

$$P/d = E/L \quad (2)$$

Therefore, at such a distance d as satisfies the above formula (2), the parallax barrier 71 or the lenticular lens 81 may be positioned.

In the above description, a general case where the number of parallax images is n has been explained. The following description will explain a concrete case where the number of parallax images is 2, that is, n=2.

FIG. 18 shows a cross section of the 3-D image display device 50 wherein the parallax barrier 71 is provided in front of the LCD element 51, and FIG. 19 shows a cross section of the 3-D image display device 50 wherein the lenticular lens 81 is provided in front of the LCD element 51.

As shown in these figures, two pixels displaying an image directed to the right eye (hereinafter referred to as right-eye image) and an image directed to the left eye (hereinafter referred to as left-eye image) respectively correspond to one aperture 72 or one cylindrical lens 82. In other words, a pixel $R_R$ and a pixel $G_L$ correspond to one aperture 72 or one cylindrical lens 82. So do a pixel $B_R$ and a pixel $R_L$, a pixel $G_R$ and a pixel $B_L$, and a pixel $R_R$, and $G_L$. The apertures 72 or the cylindrical lenses 82 have a function of directing right-eye images and left-eye images from the LCD element 51 to the observer's right eye and left eye, respectively. Arrows in the figures indicate luminous rays going toward the observer's right eye and left eye.

Incidentally, the pixel $R_R$ represents a pixel for the red color which is driven in response to a right-eye image signal, while the pixel $G_L$ represents a pixel for the green color which is driven in response to a left-eye image signal. Likewise, the pixel $B_R$ represents a pixel for the blue color which is driven in response to the right-eye image signal, the pixel $R_L$ a pixel for the red color which is driven by the left-eye image signal, the pixel $G_R$ a pixel for the green color which is driven in response to the right-eye image signal, and the pixel $B_L$ a pixel for the blue color which is driven by the left-eye image signal.

Here, FIG. 20 shows an arrangement of the pixels displaying the right-eye images and the left-eye images in the LCD element 51. The pixels which are respectively driven in response to the red, green, and blue color signals are arranged in an order as shown in the figure.

The pitch of the apertures 72 or the cylindrical lenses 82 is determined based on the formula (1), and as a result, the pitch is set to twice the pixel pitch of the LCD element 51, or slightly smaller than that. By doing so, as shown in FIG. 21, a position (an observation region) at which all the pixels in the LCD element 51 which display the right-eye images and the left-eye images can be observed is formed in front of the parallax barrier 71. Although not shown in the figures, the same applies to the case where the lenticular lens 81 is used.

FIG. 22 stereoscopically illustrates observation regions formed in front of the 3-D image display device 50. Observation regions F1 and F2 are a region where the right-eye images can be observed and a region where the left-eye images can be observed, respectively, the right-eye and left-eye images being separated by the parallax barrier 71 or the lenticular lens 81. Therefore, by placing the right eye in the observation region F1 and the left eye in the observation region F2, the observer can appreciate a 3-D image based on the right-eye and left-eye images observed. Note that such parallax as makes the right-eye and left-eye images to be recognized as a 3-D image when viewed with both the eyes is previously given to the right-eye and left eye images.

Incidentally, as shown in FIG. 22, observation regions F3 and F4 are also formed outside the observation regions F1 and F2. The observation regions F3 and F4 are formed with light which outgoes from pixels next to the pixels of the LCD element 51 corresponding to the aperture 72 or the cylindrical lens 82 and passes through the same aperture 72 or the cylindrical lens 82. Based on this principle, more observation regions are to be formed outside the observation regions F3 and F4 as well, although they are not shown in the figure.

Therefore, in the observation region F3 beside the observation region F1 for the right-eye image, an image which is originally supposed to be observed by the left eye is observed. In the observation region P4 beside the observation region F2 for the left-eye image, an image which is originally supposed to be observed by the right eye is observed.

However, if the observer observes an image with the right eye placed in the observation region F3 and the left eye placed in the observation region F1, or to state differently, the observer observes with the right eye an image to be observed by the left eye and observes with the left eye an image to be observed by the right eye, a image in which the front and the bottom are reversed is observed. Therefore, it is impossible to achieve the three-dimensional effect of causing the observer to feel as if the image approaches him/her. For this reason, it is necessary to place the right eye in the right-eye image observation region and place the left eye in the left-eye image observation region.

Incidentally, to make the 3-D image display device to display fine 3-D images, it is necessary to increase the number n of the parallax images so as to raise the resolution of the display element. However, in the case where, for example, the number n of the parallax images is increased with the total number of the pixels left unchanged, the resolution of a 3-D image recognized by the observer is 1/n in the case of the multi-view method if the number of parallax is n, and hence a 3-D image obtained is rough, making visibility lower. Therefore, to cause the device to display fine 3-D images without impairing the visibility of the 3-D images, it is necessary to increase the number n of the parallax images while reducing the size of each pixel of the display element.

Here, high precision in determining dimensions and processing is already required in manufacturing the TFTs and the color filter 55 (see FIG. 15) in the LCD element 51. Therefore, in the case where the size of each pixel in the display element is reduced aiming at high resolution, further higher precision in determining dimensions and processing is required in manufacturing the TFTs and the color filter 55. Consequently, manufacture of the LCD element 51 itself is difficult, and the yield of the LCD element 51 lowers, thereby further causing the yield of the 3-D display device to lower.

SUMMARY OF THE INVENTION

The object of the present invention is to provide such a three-dimensional (3-D) image display device that: when the number of parallax images of a 3-D image is increased so as to obtain a fine 3-D image, the yield of a display element thereof is improved, and further, the yield of the 3-D image display device is improved.

To achieve the foregoing object, a 3-D image display device of the present invention is characterized by comprising (1) a display element for displaying an image, and (2) an optical path controlling member having a plurality of light transmitting sections which transmit light which is in accordance with the image, the optical path controlling member controlling optical paths so that the light having passed through each light transmitting section reaches a right or left eye of an observer, wherein (i) the display element conducts monochromatic display, and (ii) each light transmitting section of the optical path controlling member is equipped with a color filter for selectively transmitting the light outgoing from the display element.

With the foregoing arrangement, an optical path of light outgoing from the display element is controlled by the optical path controlling member so that the light reaches the observer's right or left eye. Here, a color filter is formed at each light transmitting section, and each color filter transmits only light having information corresponding to the predetermined color. With this, the observer can observe a 3-D color image.

Incidentally, in the case where the display element is formed by using, for example, a liquid crystal display (LCD) element, the yield of the LCD element is expressed as a product of a yield of a substrate on which active elements are provided (hereinafter referred to as first substrate) and a yield of a substrate on which the color filters are provided (hereinafter referred to as second substrate).

In the aforementioned arrangement wherein the display element is an element for performing monochromatic display, there is no need to provide color filters in the display element. This allows the step of providing color filters to be omitted, thereby making the manufacture of the second substrate easier. As a result, the yield of the second substrate is improved, and accordingly, the yield of the display element is also improved. Further, so is the yield of the 3-D image display device.

Furthermore, since no color filter may be provided in the display element, the structure of the second substrate is simplified. This leads to reduction of the cost of the display element, and further, to reduction of the cost of the 3-D image display device composed of this display element and an optical path controlling member.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a cross-sectional view illustrating a structure of a parallax barrier.

FIG. 6 is a cross-sectional view illustrating another structure of the parallax barrier.

FIG. 7(*b*) is an explanatory view illustrating left-eye image data.

FIG. 7(*c*) is an explanatory view illustrating 3-D image data of the present invention obtained by compositing the right-eye image data and the left-eye image data.

FIG. 7(*d*) is an explanatory view illustrating conventional 3-D image data obtained by compositing the right-eye image data and the left-eye image data.

FIG. 20 is a plan view illustrating an arrangement of pixels in the above LCD element.

DESCRIPTION OF THE PREFERRED EMBODIMENTS

First Embodiment

The following description will explain an embodiment of the present invention, while referring to FIGS. 1 through 8.

Figure 1:
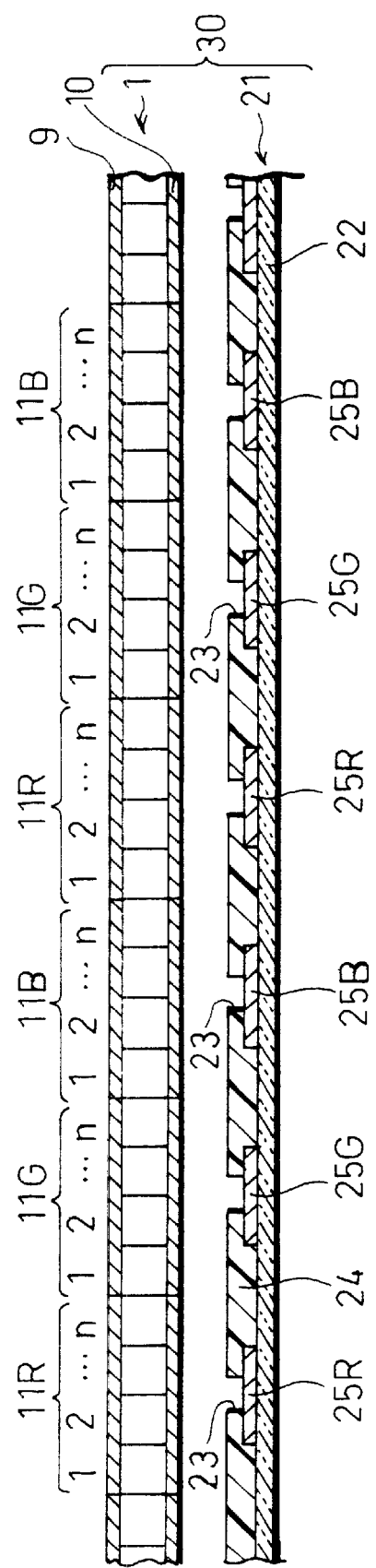
FIG. 1 is a cross-sectional view illustrating a structure of a multi-view 3-D image display device of the present invention, in which a parallax barrier is provided in front of an LCD element.

A 3-D image display device 30 of the present invention has an LCD element 1 and, in front of the LCD element 1, a parallax barrier 21 in which a plurality of apertures 23 are arranged in a two-dimensionally regular manner, as shown in FIG. 1.

Incidentally, although the 3-D image display device shown in FIG. 1 is a multi-view device, the following description will explain the present embodiment taking as an example a binocular 3-D image display device so that the explanation is easily understood.

The LCD element 1 is a display element for conducting monochromatic display, and in the present embodiment, its display mode is the TN (twisted nematic) mode for the TFT driving. The display mode may be, for example, the STN (super twisted nematic) mode for the simple matrix driving, or other modes. Further, the active elements may be MIMs (metal insulator metals), rather than the TFTs. First, the following description will explain the structure of the LCD element 1 in detail.

Figure 2:
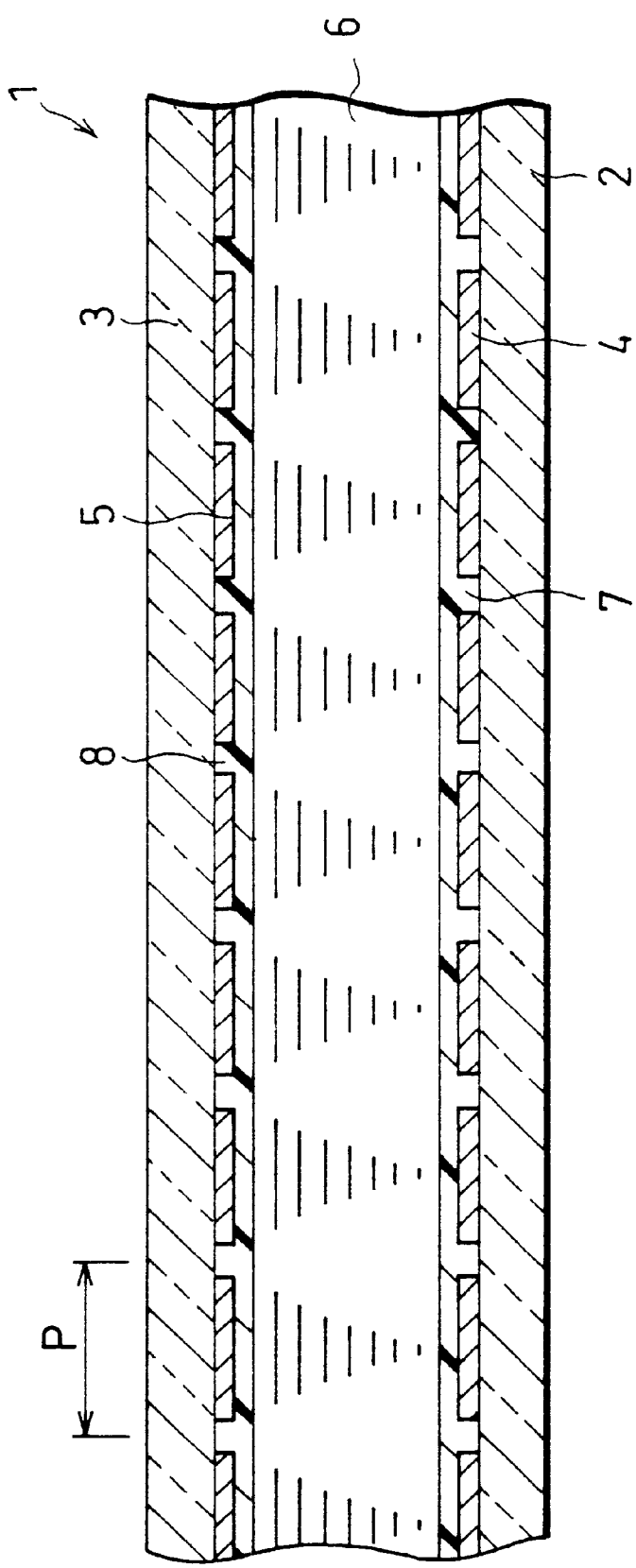
FIG. 2 is a cross-sectional view illustrating a schematic structure of the LCD element.

The LCD element 1, as shown in FIG. 2, has a TFT substrate 2 and a counter electrode 3, both made of glass, between which liquid crystal 6 is cramped. On the TFT substrate 2, TFTs (not shown) as active elements and pixel electrodes 4 are provided in a matrix form. On the other hand, on the counter substrate 2, there are provided transparent electrodes 5 made of, for example, ITO, and a black matrix (not shown) for blocking light so that unwanted light may not go into TFTs directly and separating the pixels from one another. On surfaces of the TFT substrate 2 and the counter substrate 3 on their sides to the liquid crystal 6, there are provided alignment films 7 and 8, respectively, so that their alignment directions, for example, cross each other. On outer surfaces (opposite to the liquid crystal 6) of the TFT substrate 2 and the counter substrate 3, linearly polarizing plates 9 and 10 (see FIG. 1) are provided, respectively. Further, on an outer surface side of the linearly polarizing plate 9, a backlight (not shown) is installed.

Thus, in the LCD element 1 of the present embodiment, the TFT substrate 2 does not differ at all from a usual one, and regarding the counter substrate 3, an only difference from a usual one is that a color filter is not provided thereon. The LCD element 1 is driven when driving signals respectively corresponding to colors are supplied to predetermined pixels, respectively.

Incidentally, the transparent electrodes 5 as common electrodes shown in FIG. 2 are formed in a specific pattern, but the transparent electrodes 5 may not necessarily be formed in such a pattern, and instead, one transparent electrode 5 covering all the pixels may be formed.

The black matrix may be formed on the TFT substrate 2, rather than on the counter substrate 3. In other words, the black matrix may be formed by directly applying, for example, black resist over the TFTs and patterning the black resist by the photolithography technique so that the black resist covers only the TFTs. In this case, on the counter substrate 3, only the transparent electrodes 5 and the alignment film are provided. Therefore, the structure of the counter substrate 3 is further simplified, and hence the manufacturing process of the counter substrate 3 is further simplified. Besides, a step of determining a position of the black matrix on the counter substrate 3 when the black matrix is formed becomes unnecessary, and the process of assembling the counter substrate 3 and the TFT substrate 2 is also further simplified.

Furthermore, in the assembling process of the TFT substrate 2 and the counter substrate 3, the TFT substrate 2 and the counter substrate 3 are first formed if to a size (a large size) of several panels each and combined with each other, then cut to a size of one panel, rather than being first cut to a size of one panel and thereafter combined with each other. Thereafter, the liquid crystal 6 is introduced to between the substrates.

Figure 3:
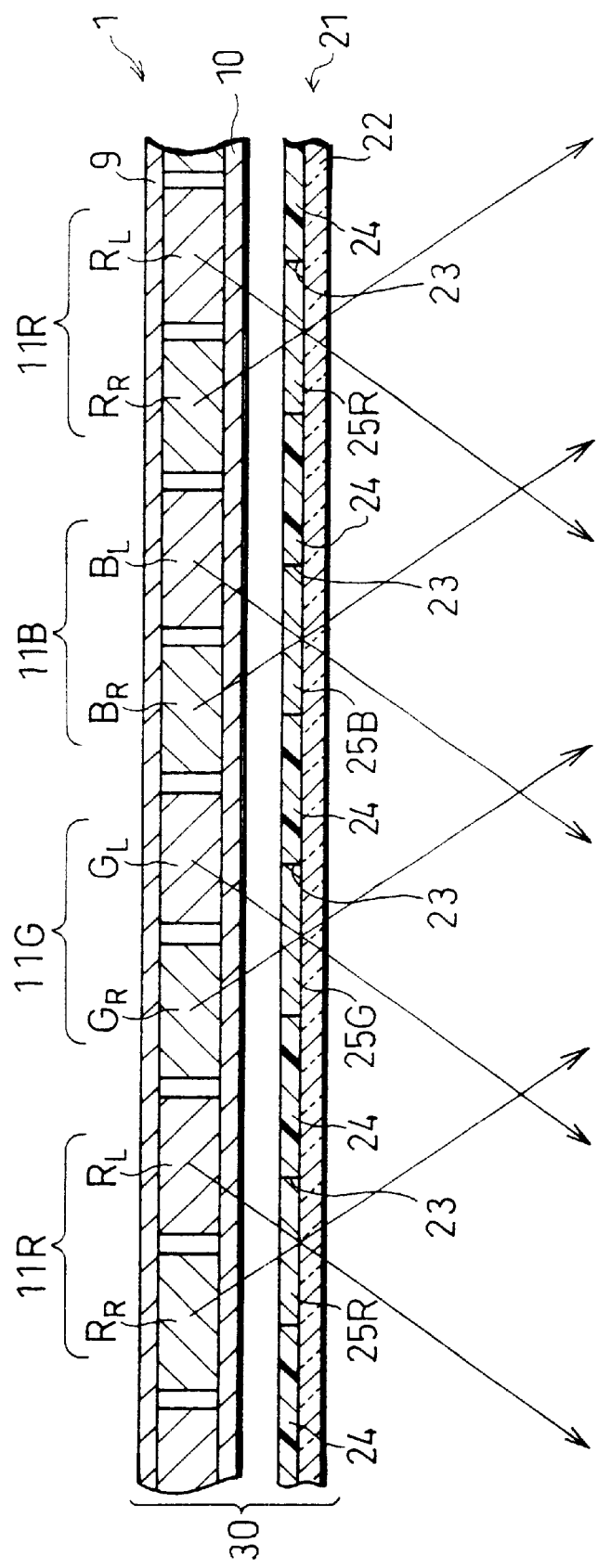
FIG. 3 is a cross-sectional view illustrating a structure of a binocular 3-D image display device in which a parallax barrier is provided in front of an LCD element.

In the LCD element 1, as shown in FIG. 3, pixel groups 11R, 11G, and 11B are formed. Each group is composed of a right-eye image display pixel driven in response to a right-eye image signal, and a left-eye image display pixel driven in response to a left-eye image signal.

More specifically, the pixel group 11R is composed of a pixel $R_R$ and a pixel $R_L$ which are driven in response to a image signal corresponding to the red color, the pixel group 11G is composed of a pixel $G_R$ and a pixel $G_L$ which are driven in response to an image signal corresponding to the green color, and the pixel group 11B is composed of a pixel $B_R$ and a pixel $B_L$ which are driven by an image signal corresponding to the blue color. Note that the subscript "$_R$" denotes the pixels driven in response to the right-eye image signal, while the subscript "$_L$" denotes the pixels driven in response to the left-eye image signal.

Figure 4:
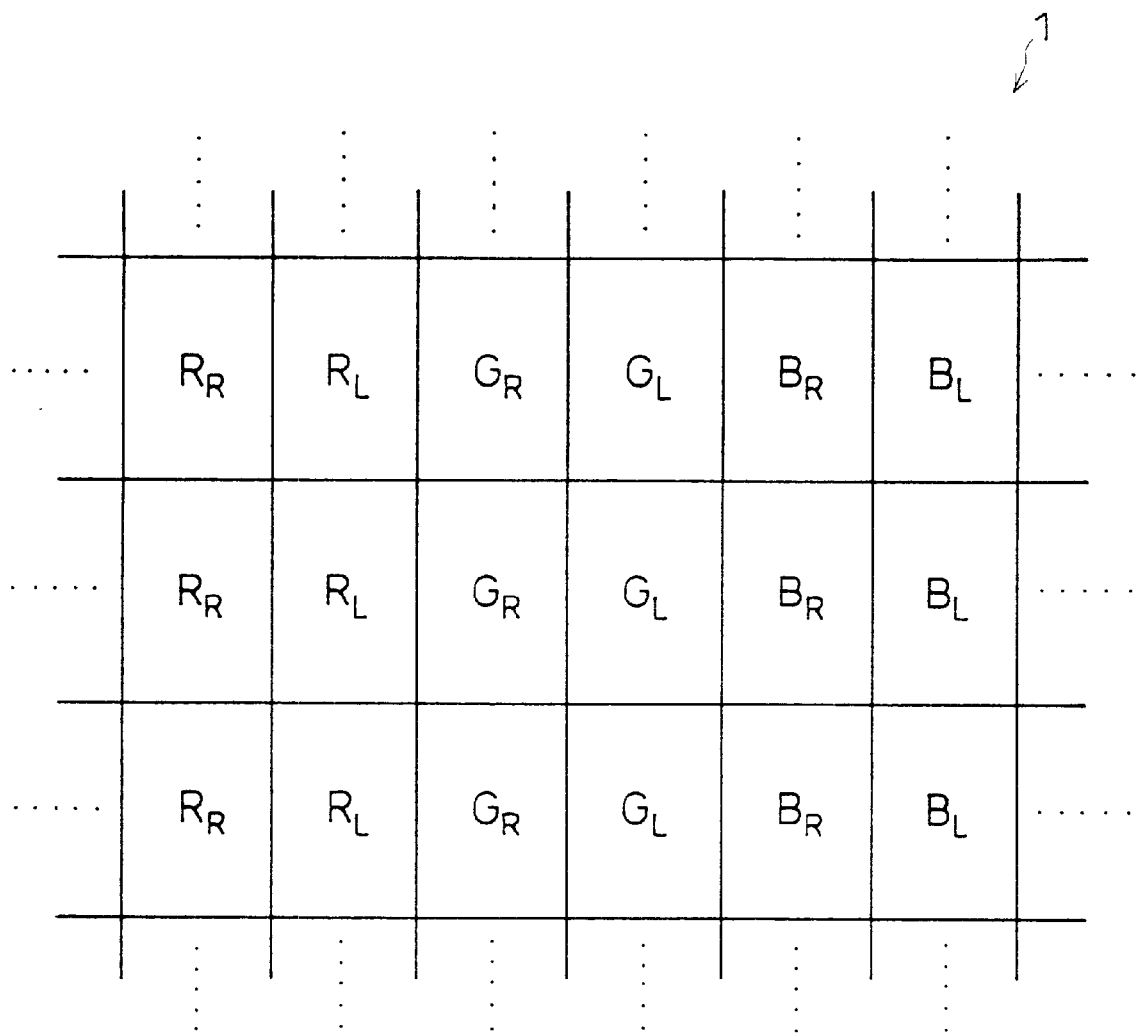
FIG. 4 is a plan view illustrating an arrangement of pixels in the LCD element.

Here, FIG. 4 is a plan view showing such an pixel arrangement. In the present embodiment, as described above, a pixel for displaying a right-eye image and a pixel for displaying a left-eye image are paired for each color, thereby forming the pixel groups 11R, 11G, and 11B. Each of the pixels belonging to the pixel groups 11R, 11G, and 11B is driven by either a right-eye image signal or a left-eye image signal which has color information of any one of the three principal colors, i.e., red, green and blue.

In the case where a binocular 3-D image display device is arranged so that the pixel groups 11R, 11G, and 11B are each composed of a pair of a right-eye image display pixel and a left-eye image display pixel as described above, parallax images are two in number, and therefore, resolution of a 3-D image observed by the observer is ½.

Figure 8:
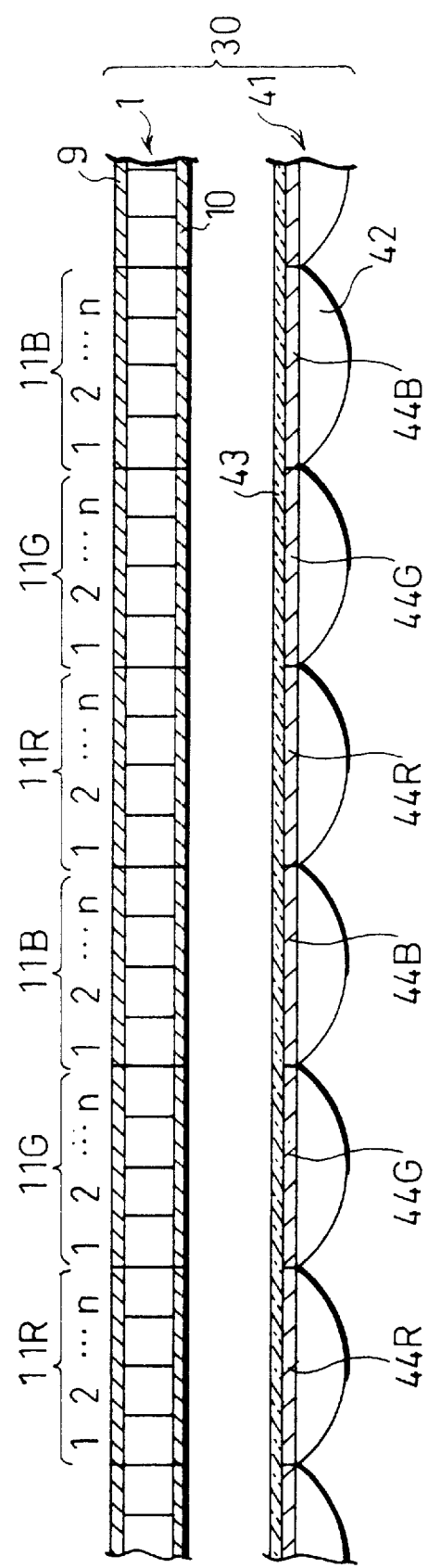
FIG. 8 is a cross-sectional view illustrating a structure of a multi-view 3-D image display device of the present invention, in which a lenticular lens is provided in front of an LCD element.

Incidentally, each of the image groups 11R, 11G, and 11B may be composed of 3 or more pixels. For example, in the case where the 3-D image display device 30 is a multi-view device having n parallaxes, pixel groups 11R, 11G, and 11B each of which is composed of n pixels are formed in the LCD element 1, as shown in FIGS. 1 and 8. Here, likewise, the pixel groups 11R, 11G, and 11B are composed of the pixels driven in response to a color signal corresponding to red, the pixels driven in response to a color signal corresponding to green, the pixels driven in response to a color signal corresponding to blue, respectively. Therefore, in this case, pixel arrangements in the pixel groups 11R, 11G, and 11B are as follows, respectively:

11R (R1, R2, R3, . . . Rn)

11G (G1, G2, G3, . . . Rn)

11B (B1, B2, B3, . . . Bn)

Incidentally, in the case of a multi-view 3-D image display device having n parallaxes, resolution of a 3-D image observed by the observer is 1/n.

The following description will explain a structure of the parallax barrier 21. As shown in FIGS. 3 and 5, the parallax barrier 21 (optical path controlling member) controls an optical path of light corresponding to an image displayed by the LCD element 1 so that the light reaches the observer's right eye or left eye. The plurality of apertures 23 serving as light transmitting sections, and light blocking members 24 are regularly and alternately provided on a substrate 22 made of glass or the like. Incidentally, each light blocking member 24 composes a part of the same substrate, and the apertures 23 are slits formed in the same substrate. Therefore, in other words, the light blocking members 24 are formed so as to surround the apertures 23. The parallax barrier 21 is disposed in front of the LCD element 1 in a manner such that lights outgoing from the pixel groups 11R, 11G, and 11B in the LCD element 1 pass through corresponding apertures 23, respectively. Note that the pitch p of the apertures 23 is set so as to satisfy the aforementioned formula (1).

Further, each aperture 23 is provided with a monochromatic color filter of any one of red, green and blue. More specifically, the apertures 23 corresponding to the pixel groups 11R, 11G, and 11B are provided with a red color filter 25R, a green color filter 25G, and a blue color filter 25G, respectively. Therefore, lights outgoing from the pixel groups 11R, 11G, and 11B go through the color filters 25R, 25G, and 25B, respectively, thereby becoming recognized as lights of red, green, and blue, respectively. Thus, the color filters 25R, 25G, and 25B have a light selective transmission function of selectively transmitting the lights outgoing from the picture groups 11R, 11G, and 11B, respectively, so that each of the color filters transmits only light corresponding to the color thereof.

Incidentally, in manufacturing the parallax barrier 21, whichever may be first formed on the substrate 22, the light blocking members 24 or the color filters 25R, 25G, and 25B. What is necessary any way is that the color filters 25R, 25G, and 25B are formed accurately so as to fall on spaces between the light blocking members 24 (that is, so as to fall on the apertures 23).

Incidentally, in the present embodiment, since the pixel groups and the color filters correspond to each other at 1:1 ratio, the pitch of the color filters can be made further greater than the pitch of the TFTs as the number n of the parallax images is increased.

In other words, in the case of the multi-view 3-D image display device, one pixel group having n pixels, if the number of parallax of the image display device is n, corresponds to one color filter. A usual LCD element normally has a width of about 100 $\mu$m per one pixel. Therefore, in the case where a binocular 3-D image display device is formed using the aforementioned LCD element, the pitch of the color filters is 200 $\mu$m since one color filter is formed per two pixels. Further, since a width of a minimum pixel of the current LCD element is about 20 $\mu$m, the pitch of the color filters is 80 $\mu$m in the case where the LCD element is applied to, for example, a multi-view 3-D image display device having four parallaxes. Thus, as the number n of the parallax images is increased, the formation of the color filters becomes easier. As a result, the yield of the LCD element is improved.

The following description will explain a method for forming an image to be three-dimensionally displayed.

In the case where 3-D display is performed using the LCD element 1 with the pixel arrangement shown in FIG. 4, first of all, a right-eye image and a left-eye image have to be generated. Here, one of these images has to be an image resulting on adding parallax to the other image, the parallax being exactly for a distance between the right and left eyes.

Here, in the case, for example, an image called 3-D computer graphic is formed, usually how an object with three-dimensional coordinates is expressed from a given point of view is calculated by a computer, and a result is outputted and displayed as two-dimensional image data. To display such a 3-D computer graphic image using the 3-D image display device of the present invention, a right-eye image as shown in FIG. 7(a) is formed first, then a point of view is moved to a position of the left eye and a left-eye image as shown in FIG. 7(b) is formed.

In the case where cameras or the like are used, two parallax images can be obtained in the following manner. Namely, two cameras are placed side by side at positions corresponding to the right and left eyes respectively and taking a photo of an object. Then, images thus taken are digitalized, so as to be ready to be displayed as shown in FIGS. 7(a) and 7(b).

Figure 7A:
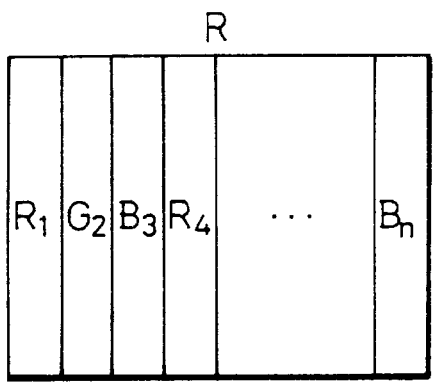
FIG. 7(*a*) is an explanatory view illustrating right-eye image data.
Figure 7B:
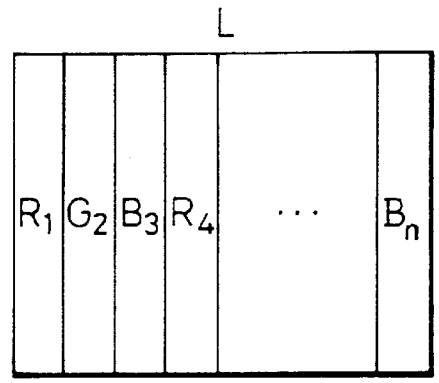

Here, the right-eye image shown in FIG. 7(a) is composed of data $R_1$, $G_2$, $B_3$, $R_4$, $G_5$, . . . $R_{n-2}$, $G_{n-1}$, and $B_n$, and likewise the left-eye image shown in FIG. 7(b) is composed of data $R_1$, $G_2$, $B_3$, $R_4$, $G_5$, . . . , $R_{n-2}$, $G_{n-1}$, and $B_n$. The foregoing R, G, and B denote image data corresponding to the red, green, and blue color image signals respectively, and the numbers subscripted denote dot numbers in a horizontal direction.

Incidentally, the reason why the right-eye image and the left-eye image are vertically divided in each dot is that the apertures 23 of the parallax barrier 21 of the present embodiment are long in a vertical direction of an image.

Figure 7C:
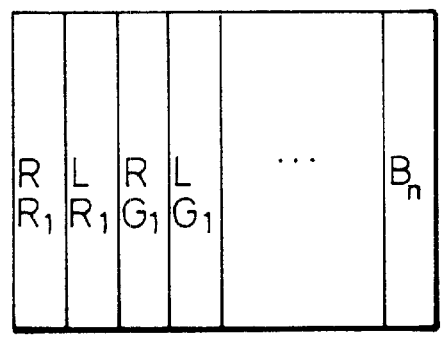

Then, the images shown in FIGS. 7(a) and 7(b) are re-arranged so that the right-eye image and the left-eye image are alternately placed side by side, whereby an image to be three-dimensionally displayed (hereinafter referred to as 3-D display image) is formed, as shown in FIG. 7(c).

In the case of the present embodiment, the 3-D display image is composed of data $(R)R_1$, $(L)R_1$, $(R)G_2$, $(L)G_2$, $(R)B_3$, $(L)B_3$, $(R)R_7$, $(L)R_7$, $(R)G_8$, $(L)G_8$, $(R)B_9$, $(L)B_9$, ..., $(R)R_n$, $(L)R_n$. Note that (R) and (L) denote the right-eye image data and the left-eye image data, respectively. Thus, right-eye and left-eye image data for the same color form a pair, and one 3-D display image is formed with a plurality of such pairs.

Here, $(R)R_4$, $(L)R_4$, $(R)G_5$, $(L)G_5$, $(R)B_6$, $(L)B_6$, and the like are not used. This is because, in forming one 3-D display image with the right-eye image and the left-eye image, resolution of each image has to be reduced to half. Image data to be used may be appropriately selected from among the data shown in FIGS. 7(a) and 7(b), depending on the image.

Figure 7D:
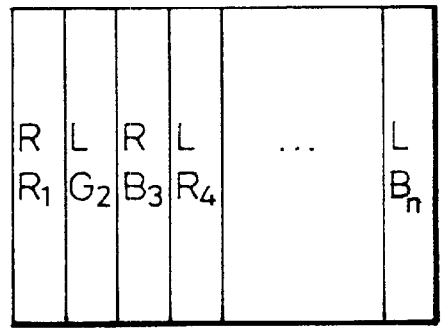

For example, a conventional data arrangement resulting on compositing the images shown in FIGS. 7(a) and 7(b) is shown in FIG. 7(d). To be more specific, the data arrangement is as follows:

$(R)R_1$, $(L)G_2$, $(R)B_3$, $(L)R_4$, $(R)G_5$, $(L)B_4$, ..., $(L)R_{n-2}$, $(R)G_{n-1}$, $(L)B_n$,

In other words, in the conventional case, right-eye and left-eye image data for different colors form a pair, and one 3-D display image is formed with a plurality of such pairs.

The following description will explain an operation of the 3-D image display device 30 incorporating the aforementioned LCD element 1 and parallax barrier 21, while referring to FIG. 3.

First of all, light outgoing from the backlight (not shown) passes through the linearly polarizing plate 9 of the LCD element 1, thereby becoming a linearly polarized light and entering each pixel. Here, since no color filter is provided to the LCD element 1, white light outgoes from each pixel, which is driven by a predetermined image signal, of the LCD element 1. An intensity of the white light has been modulated in accordance with each of color signals which are allocated to the pixels, respectively.

Lights outgoing from the pixels $R_R$ of the LCD element 1 are converted to red lights when passing through the red color filters 25R which are disposed at positions corresponding to the pixels $R_R$, respectively, and reach the observer's right eye. On the other hand, lights outgoing from the pixels $R_L$ are also converted to red lights when passing through the red color filters 25R, and reach the observer's left eye. Likewise, lights outgoing from the pixels $G_R$ and $G_L$ pass through the color filters 25G disposed at positions corresponding to these pixels, respectively, while lights outgoing form the pixels $B_R$ and $B_L$ pass through the color filters 25B disposed at positions corresponding to these pixels, thereby being converted to lights of green and blue, respectively, and reaching the observer's right and left eyes. By doing so, a color 3-D image is recognized by the observer.

According to the aforementioned arrangement, there is no need to provide a color filter composed of color filters R, G, and B on the counter substrate 3, since the LCD element 1 is an element for performing monochromatic display. This makes it unnecessary to provide thereon a protection film for protecting the color filter. Therefore, the structure on the counter substrate 3 side can be simplified, thereby making the manufacture of the counter substrate 3 easier, and reducing the cost of the LCD element 1.

Furthermore, in the case of the present embodiment, since no color filter is provided to the counter substrate 3, the yield of the counter substrate 3 is surely improved, as compared with the case where the color filter is provided to the counter substrate 3. This leads to improvement of the yield of the LCD element 1 since the yield of the LCD element 1 is expressed as a product of the yield of the TFT substrate 2 by the yield of the counter substrate 3, and accordingly, the yield of the 3-D image display device 30 is also improved. Moreover, since no color filter is provided to the And counter substrate 3, precision required in combining the TFT substrate 2 and the counter substrate 3 in manufacturing small-size LCD elements 1 can be relaxed.

Furthermore, in manufacturing the parallax barrier 21, high dimensional precision is required relating to the pitch of the apertures 23 and a width of the aperture, and therefore, high precision may not be required in manufacturing the color filters 25R, 25G, and 25B. More specifically, the color filters 25R, 25G, and 25B are formed so as to fill apertures 23 which are formed with high precision by the photolithography technique. Therefore, the precision required in forming the color filters is not as high as that required in forming the apertures 23.

On the other hand, the width of each aperture 23 of the parallax barrier, that is, the width of each of the color filters 25R, 25G, and 25B accords with a total width of a set of pixels which display parallax images 1 through n respectively (that is, a width of one pixel group). Therefore, each of the color filters in the present embodiment has a width several times greater than the width of the color filters which are usually provided to pixels at a 1:1 ratio in the LCD element.

Therefore, as to the binocular 3-D image display device which is taken as example in explaining the present embodiment, it is possible to easily form the color filters 25R, 25G, and 25B in the parallax barrier 21 even in the case where the size of the pixels in the LCD element 1 is reduced so as to increase the number n of the parallax images to achieve high resolution. As a result, high resolution of 3-D images can be easily achieved by reducing the pixel size, without lowering the yield of the 3-D image display device.

In the case of a usual LCD element, color filters are formed on a counter substrate, and thereon provided are a color filter protection film (leveling film) for compensating level differences caused by the color filters and an alignment film for controlling alignment of liquid crystal. Since polyimide is used for forming the alignment film, the color filters are subject to a temperature of 180° C. to 240° C. in annealing and molding the polyimide. Therefore, usually, heat resistance against such a temperature is required of the color filters in the LCD element.

In contrast, since color filters are not provided in the LCD element 1 in the present embodiment in the foregoing manner, such heat resistance is not required of the color filters of the present embodiment. Therefore, there is no need to use materials of high performance for forming the color filters 25R, 25G, and 25B which are provided outside the LCD element 1. As a result, the cost for forming the color filters 25R, 25G, and 25B can be reduced, and hence, the cost of the 3-D image display device to which the color filters 25R, 25G, and 25B are adopted can be reduced as well.

Incidentally, the parallax barrier 21 may be arranged as shown in FIGS. 1 and 6. More specifically, at least ends of the color filters 25R, 25G, and 25B on the substrate 22 are covered with light blocking members 24, so that apertures 23 serving as light transmitting sections are formed at a pitch p satisfying the above-described formula (1).

Generally, to perform desired 3-D image display, it is necessary that the apertures 23 are formed at the pitch p with high precision. Therefore, the light blocking members 24 are normally formed by the photolithography technique with high precision.

Here, in the case where the 3-D image display device 30 is a binocular device and a pixel pitch P, a distance d between the LCD element 1 and the parallax barrier 21, and a distance L between the observer and the 3-D image display device are 100 μm, 2 mm, and 80 cm, respectively, the pitch p of the parallax barrier 21 (pitch of the apertures 23) is 199.5 μm, from the formula (1). A level of precision required to realize such a pitch p cannot be achieved without the photolithography technique. On the other hand, since the aperture width between adjacent light blocking members 24 is at a level of 40 μm to 80 μm, a large portion of the color filters 25R, 25G, and 25B is covered with the light blocking members 24 whose width is 119.5 μm to 159.5 μm.

Therefore, in the aforementioned arrangement, accuracy required in forming the color filters 25R, 25G, and 25G may not be as high as the accuracy in achieving the aperture pitch of the light blocking members, and some degree of freedom may be given to the width of the color filters 25R, 25G, and 25B. As a result, the color filters 25R, 25G, and 25B can be relatively easily formed.

Incidentally, an arrangement wherein color filters are provided to a parallax barrier, as in the present embodiment, is also disclosed in the Japanese Publication for Laid-Open Patent Application No. 146346/1996 (Tokukaihei 8-146346), and the arrangement is apparently similar to the present invention. However, this conventional arrangement fundamentally differs from the present invention in the following aspects:

(A) color filters of three colors, i.e., red, green, and blue are provided in each aperture of the parallax barrier; and (B) color filters are also provided on a display element side, in an order of R→G→B.

The conventional arrangement is designed so that light outgoing from a pixel corresponding to, for example, red in the display element is observed only through the red filter on the parallax barrier side. In other words, light outgoing through a color filter on the display element side is observed only through a color filter of the same color on the parallax barrier side. By doing so, light coming from pixels next to the pixel observed is absorbed by the color filters, whereby mixing of parallax images does not occur.

However, according to (A) above, color filters of the three colors are provided in one aperture. Therefore, it is impossible to achieve an effect that precision required in forming the color filters is relaxed, that is, the effect characterizing the present invention. Further, according to (B) above, the light outgoing from the display element passes through the color filters twice. As a result, the display is darker than that of the present invention, whereby visibility lowers.

Therefore, the foregoing conventional arrangement is not capable of solving the problems which the present invention is designed to solve, and the concept thereof is fundamentally different from that of the present invention. In the present invention, the light outgoing from the display element passes through the color filters only once, and as a result the display is caused to have higher brightness, as compared with the foregoing conventional arrangement.

Second Embodiment

The following description will explain another embodiment of the present invention, while referring to FIGS. 8 through 12. The present embodiment is explained by taking an example a case where a lenticular lens 41 is used, in the place of the parallax barrier 21 (see FIG. 1), in the 3-D image display device 30. Note that the members having the same structure (function) as those in the first embodiment will be designated by the same reference numerals and their description will be omitted.

Figure 9:
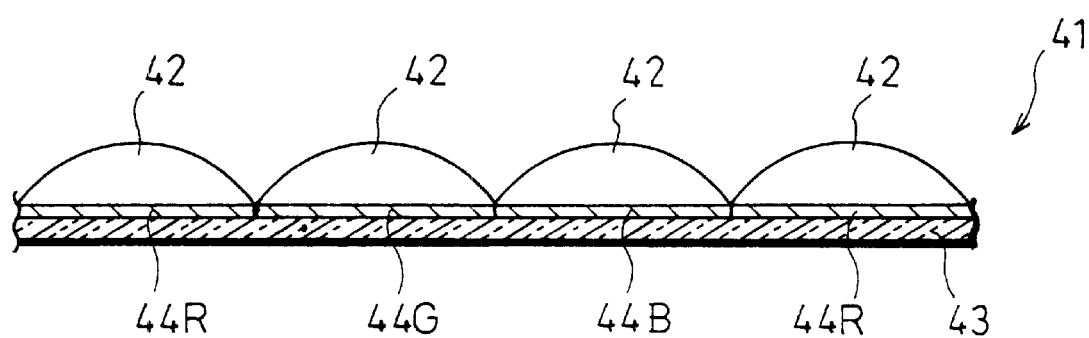
FIG. 9 is a cross-sectional view illustrating a structure of the lenticular lens.

As shown in FIGS. 8 and 9, the lenticular lens 41 is composed of a substrate 43 made of glass or the like, and cylindrical lenses 42 arrayed on the substrate 43. Any one of red color filters 44R, green color filters 44G, and blue color filters 44B is provided between each cylindrical lens 42 and the substrate 43. The cylindrical lenses 42 serve as light transmitting sections which transmit light outgoing from the pixels of the LCD element 1. The lenticular lens 41 is disposed in front of the LCD element 1 so that lights outgoing from 93 the pixel groups 11R, 11G, and 11B of the LCD element 1 pass through the corresponding color filters 44R, 44G, and 44B, respectively.

Incidentally, the pitch p of the cylindrical lenses 42 is set so as to satisfy the aforementioned formula (1), as well as to accord with the a total width of the set of pixels in the LCD element 1 which display parallax images 1 through n respectively (that is, a width of one pixel group). Therefore, each of the color filters 44R, 44G, and 44B which are provided so as to correspond to the cylindrical lenses 42 respectively is allowed to have a width several times greater than that of color filters which are provided in an LCD element so as to correspond to the pixels at 1:1 ratio.

Incidentally, methods of manufacturing the cylindrical lenses 42 include a method of injection molding, and a method wherein photo-curing resin is placed in a mold and pressed so as to be cured.

According to the foregoing arrangement, respective lights outgoing from the pixel groups 11R, 11G, and 11B pass through the corresponding color filters 44R, 44G, and 44B thereby becoming recognized as red, green, and blue colors, respectively. Therefore, the lenticular lens 41 has a light selective transmission function identical to that of the parallax barrier 21. As a result, the same function and effect as that in the case where the parallax barrier 21 is used can be achieved.

Figure 10:
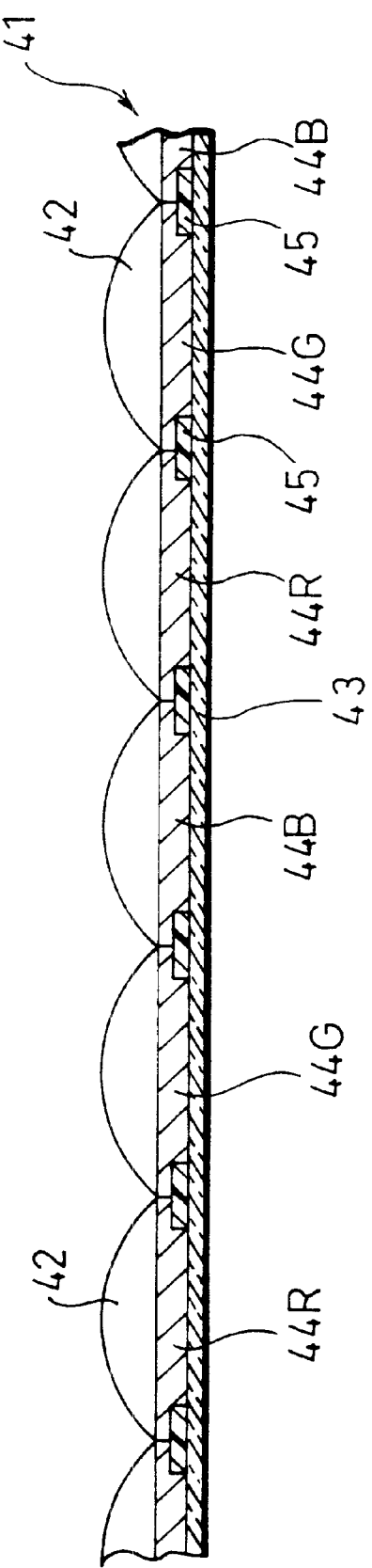
FIG. 10 is a cross-sectional view illustrating another structure of the lenticular lens.

The lenticular lens 41 may be arranged, for example, as shown in FIG. 10. To be more specific, the light blocking members 45 may be formed along boundaries of the color filters 44R, 44G, and 44B on the substrate 43.

In the foregoing case, a transmitted light quantity decreases as compared with the case where the light blocking members 45 are not formed, but the precision required in determining the positions of the cylindrical lenses 42 and the color filters 44R, 44G, and 44B so as to correspond with each other is allowed to be rougher for the width of the light blocking members 45, and hence, the lenticular lens 41 can be formed easily.

Figure 11:
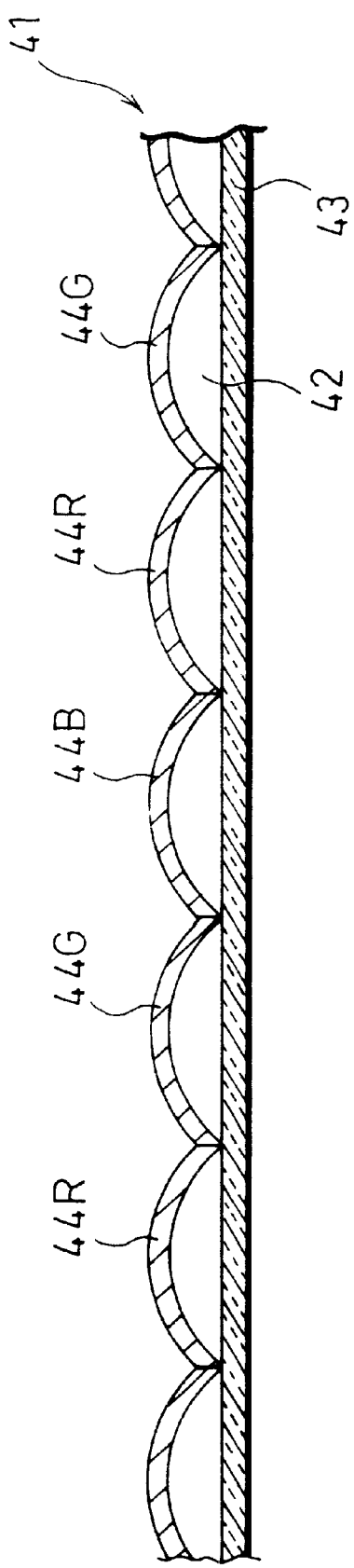
FIG. 11 is a cross-sectional view illustrating still another structure of the lenticular lens.

The color filters 44R, 44G, and 44B may not be necessarily disposed between the substrate 43 and the cylindrical lenses 42. For example, as shown in FIG. 11, the color filters 44R, 44G, and 44B may be formed on surfaces of the cylindrical lenses 42 provided directly on the substrate 43. In this case, an effect identical to that of the present embodiment can be achieved.

Figure 12:
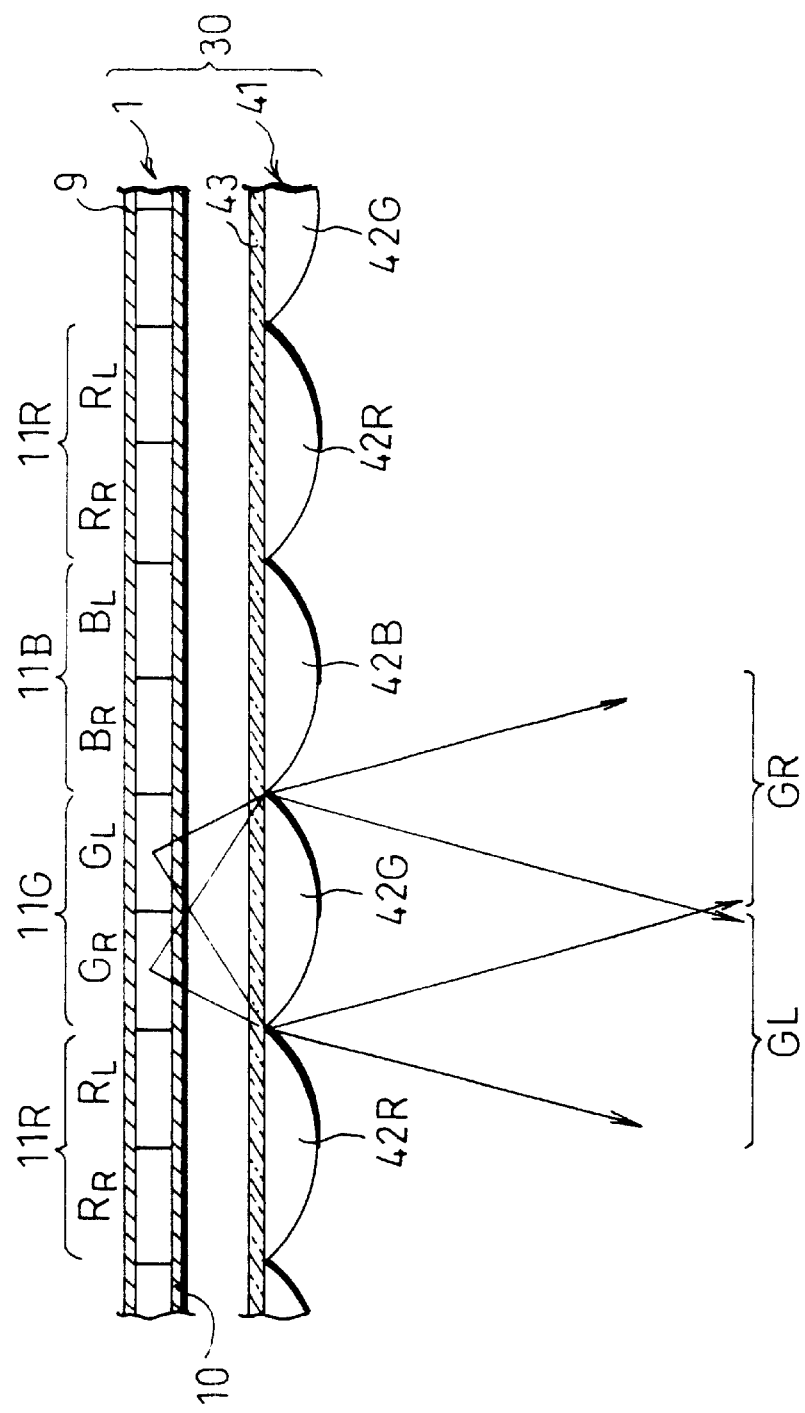
FIG. 12 is a cross-sectional view illustrating a structure of a binocular 3-D image display device in which a lenticular lens is provided in front of the LCD element.

Further, for example, as shown in FIG. 12, the lenticular lens 41 may be formed by arranging, directly on the substrate 43, cylindrical lenses 42R, 42G, and 42B which are previously colored in red, green, and blue, respectively. In this case, the cylindrical lenses 42 are easily produced in the following manner. First, heat-curing photosensitive resin containing a pigment is formed in a pattern by the photolithography technique, and then, it is melted so that edges thereof are rounded, thereby being formed in lenses. In this case, a process of determining positions of the color filters and the cylindrical lenses so as to correspond with each other is unnecessary.

Third Embodiment

Figure 13:
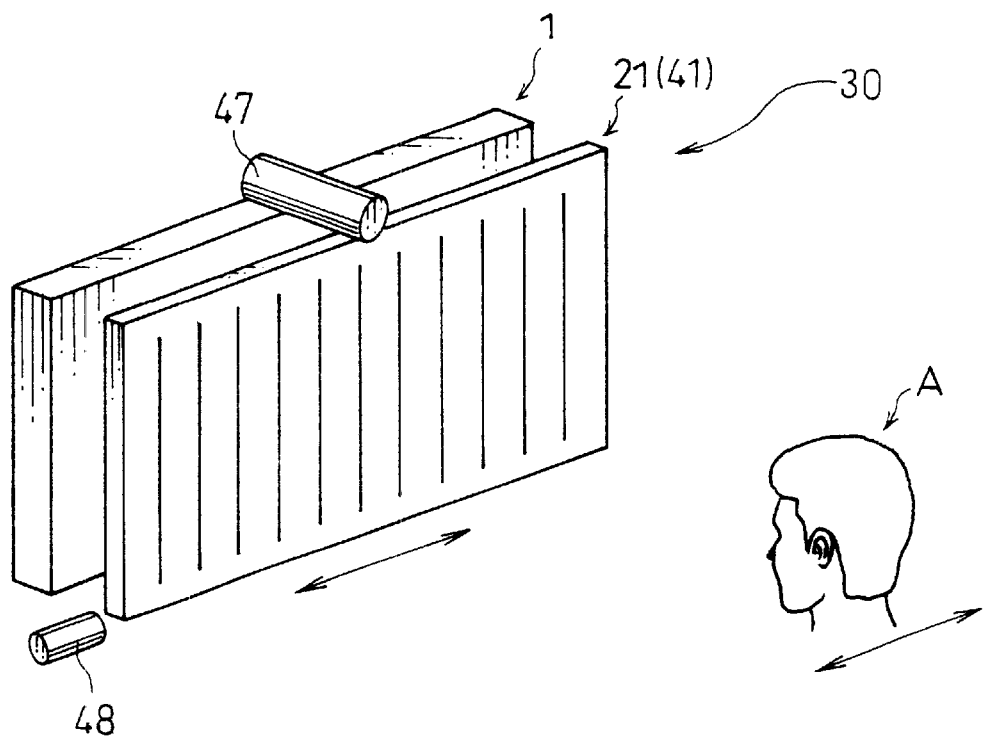
FIG. 13 is a perspective view illustrating a structure of a 3-D image display device in which a follow-up system is provided.
Figure 14:
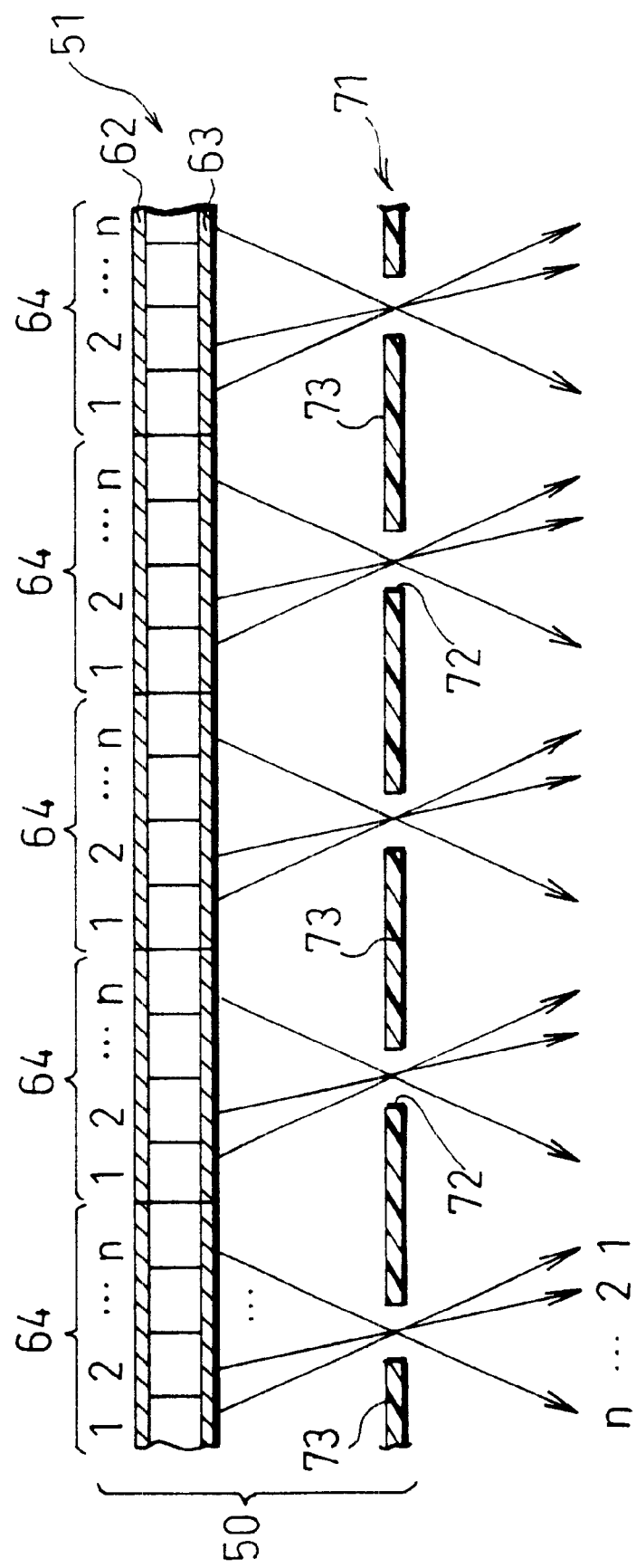
FIG. 14 is a cross-sectional view illustrating a structure of a conventional multi-view 3-D image display device in which a parallax barrier is provided in front of an LCD element.
Figure 15:
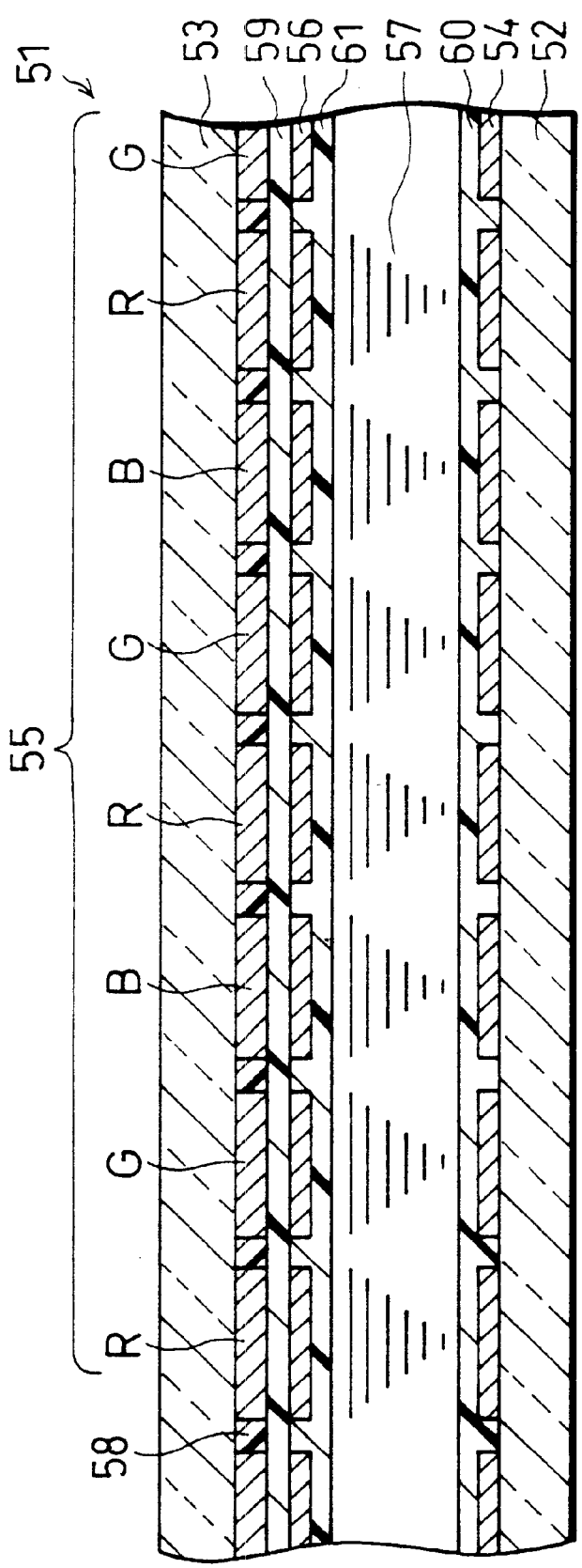
FIG. 15 is a cross-sectional view illustrating a schematic structure of the LCD element.
Figure 16:
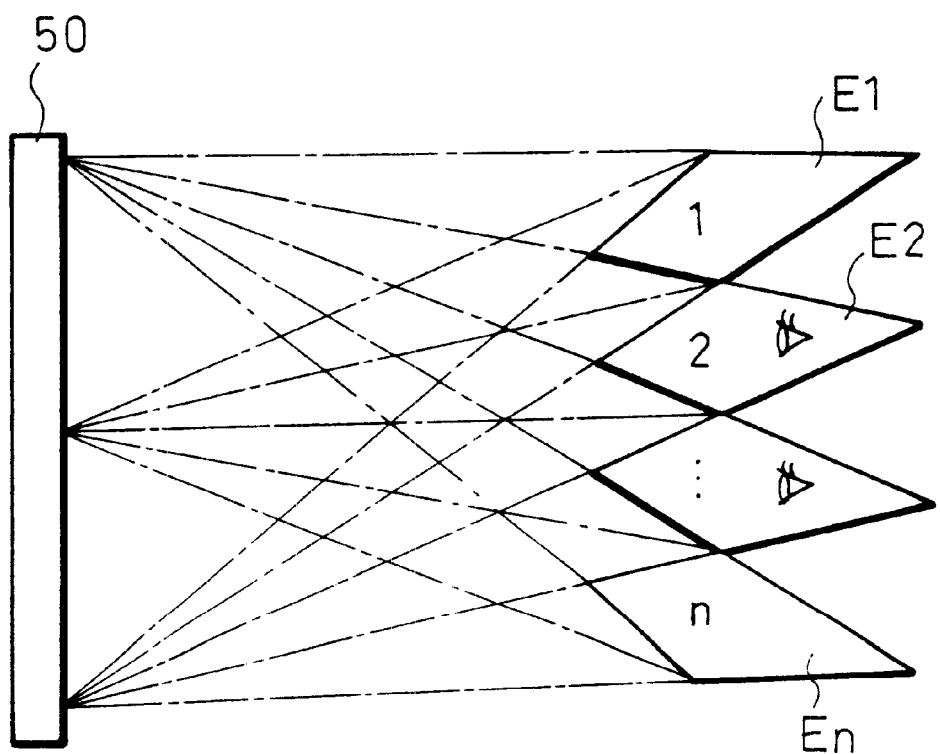
FIG. 16 is a plan view illustrating observation regions of a 3-D image, which are formed in front of a 3-D image display device.
Figure 17:
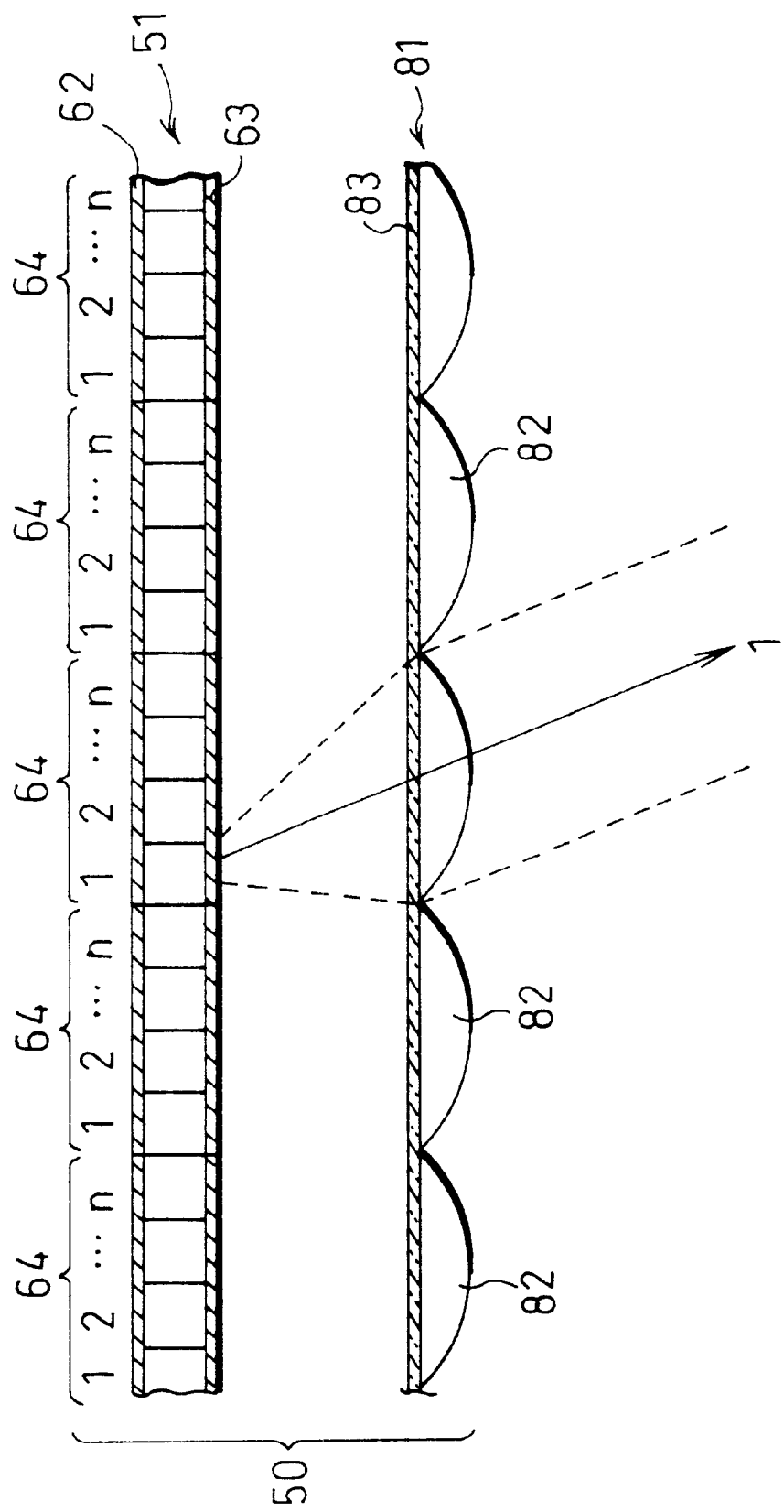
FIG. 17 is a cross-sectional view illustrating a structure of a conventional multi-view 3-D image display device in which a lenticular lens is provided in front of an LCD element.
Figure 18:
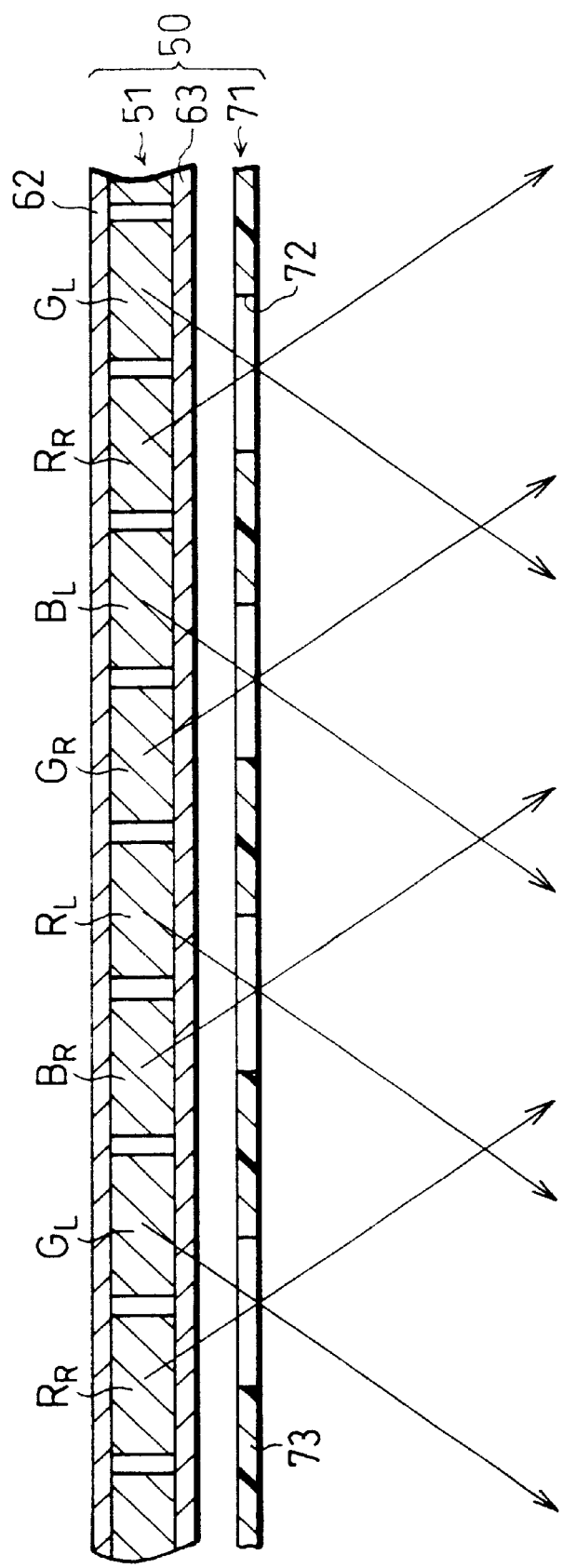
FIG. 18 is a cross-sectional view illustrating a structure of a conventional binocular 3-D image display device in which a parallax barrier is provided in front of an LCD element.
Figure 19:
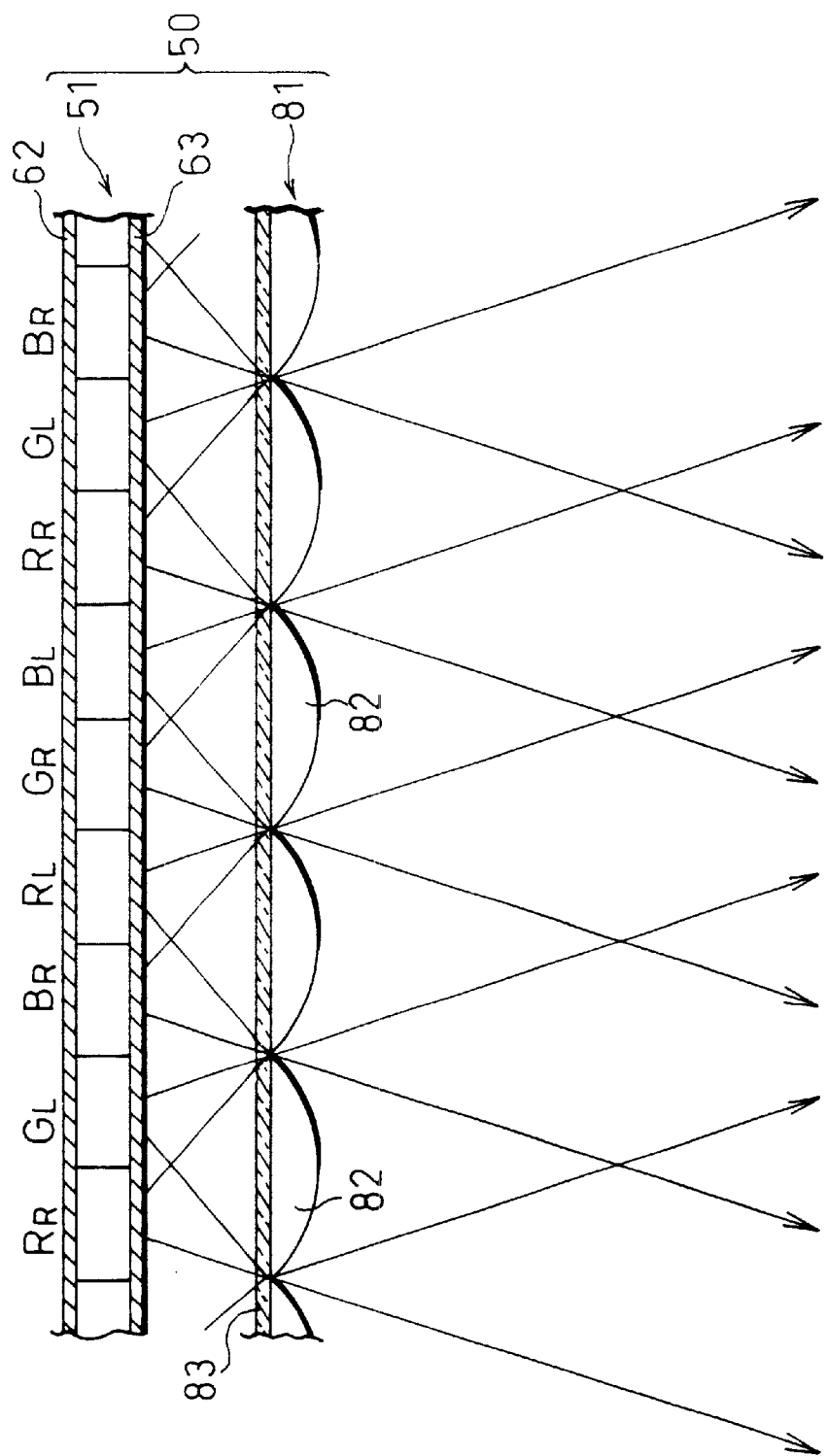
FIG. 19 is a cross-sectional view illustrating a structure of a conventional multi-view 3-D image display device in which a lenticular lens is provided in front of an LCD element.
Figure 21:
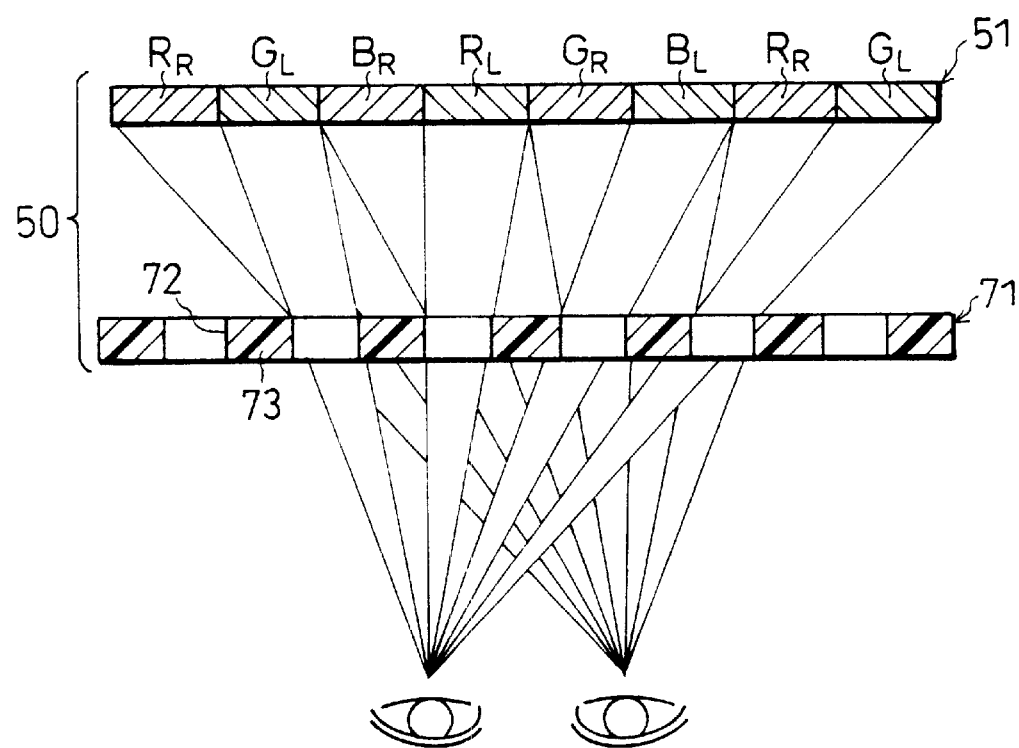
FIG. 21 is a cross-sectional view illustrating a state where a right-eye image and a left-eye image enter an observer's right eye and left eye, respectively.

The following description will explain another embodiment of the present invention, while referring to FIG. 13. The members having the same structure (function) as those in the first and second embodiments will be designated by the same reference numerals and their description will be omitted.

Figure 22:
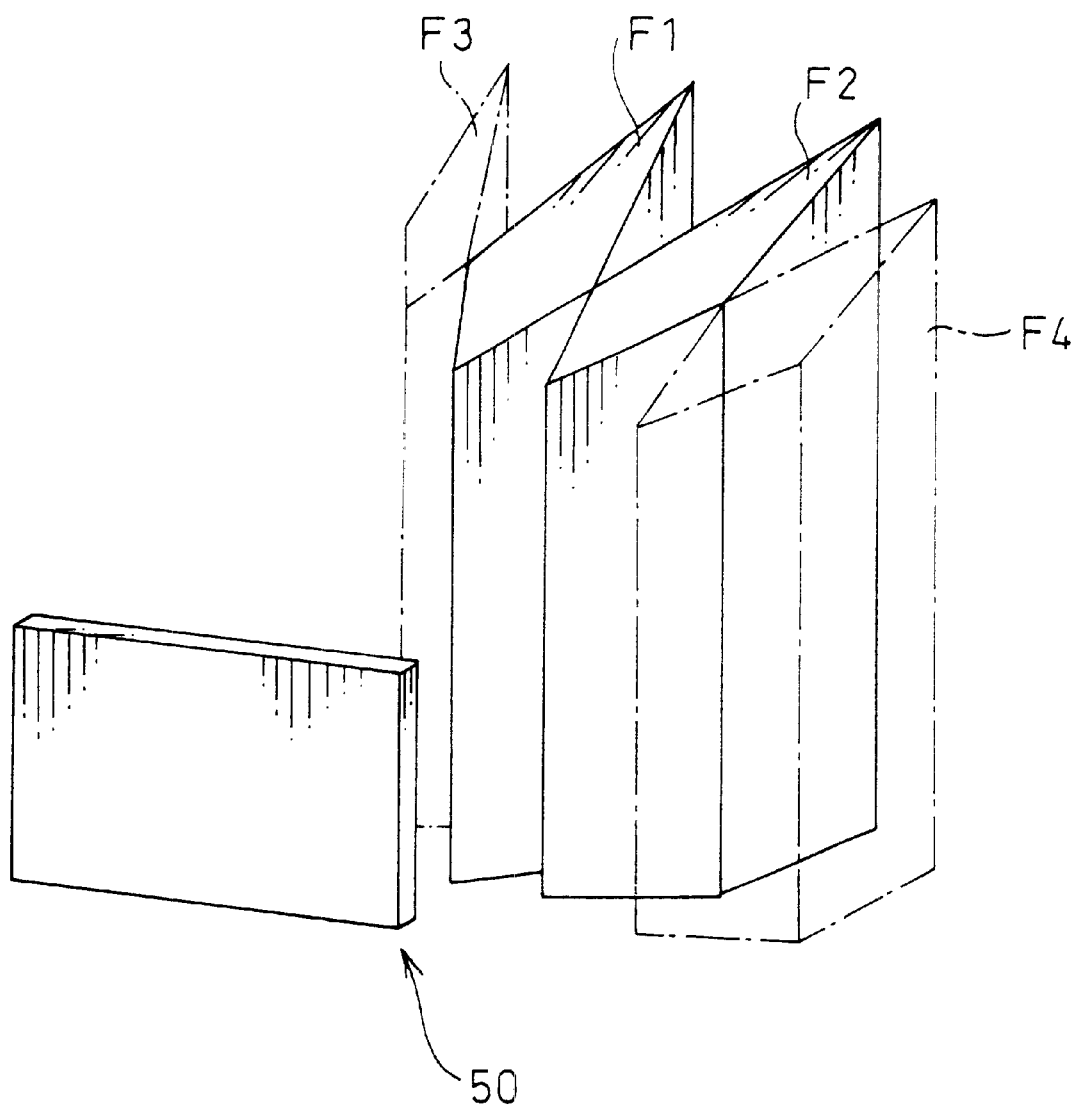
FIG. 22 is a perspective view stereoscopically illustrating observation regions of a 3-D image which are formed in front of a 3-D image display device.

A maximum width of the observation regions F1 and F2 shown in FIG. 22 is normally set to 65 mm considering the average distance (about 65 mm) between a human's right and left eyes, and the observer is allowed to move the head only to a maximum of 65 mm. Therefore, the parallax barrier method or the lenticular lens method has an advantage that the observer can observe 3-D images without wearing special glasses such as shutter glasses or polarizing glasses, whereas these methods have a drawback in that the observation region available to the observer is limited to some extent. The limitation on the observation range stems from that the parallax barrier 21 or the lenticular lens 41 is fixed with respect to the LCD element 1.

Therefore, in the present embodiment, as shown in FIG. 13, the 3-D image display device 30 of the first or second embodiment further includes a position detecting sensor 47 (position detecting means) for detecting a position of the observer A, and a motor 48 (moving means). Based on position information on the observer A detected by the position detecting sensor 47, the motor 48 moves the parallax barrier 21 or the lenticular lens 41, following the movement of the observer A, in the same direction as that of the movement of the observer A.

The position detecting sensor 47 may be composed of a CCD (charged coupled device), or combination of a infrared LED (light emitting diode) and a position sensitive device (PSD).

With this arrangement, the parallax barrier 21 or the lenticular lens 41 moves, following the movement of the observer A to right or left, thereby causing the observation regions F1 and F2 to move as the observer A moves. Therefore, when the observer A moves, his or her points of view do not go outside the observation regions F1 and F2. As a result, the observer A is allowed to observer 3-D images at all times even if the head is not fixed. As a result, by the aforementioned follow-up method, the observation region can be expanded several times to about ten times as compared with the method wherein the parallax barrier 21 or the lenticular lens 41 is fixed with respect to the LCD element 1.

Incidentally, in the case of the multi-view 3-D image display device where the number of parallax is n and hence n observation regions are obtained, the observer A's points of view scarcely fail to fall in any two of the n observation regions, respectively, even when he/she moves. In contrast, in the case of the binocular 3-D image display device where only two observation regions are available, the observer A's points of view tend to go outside the observation regions when he/she moves even slightly. Therefore, the follow-up method of this type is more effective particularly for the binocular 3-D image display device.

Incidentally, the follow-up method of this type is disclosed in the Japanese Publication for Laid-Open Patent Application No.44995/1990 (Tokukaihei 2-44995). Such a conventional technique as above, however, has a drawback in that the cost of the 3-D image display device rises for the aforementioned follow-up system. However, since the present invention makes the cost of the display element to lower, the increase in the cost of the device due to the follow-up system can be avoided to some extent by lowering the cost of the display element. Thus, the total cost of the device can be decreased.

As described above, the 3-D image display device of the present invention is characterized in that each of the color filters corresponding to the light transmitting members respectively has one color selected from among three principal colors of red, green, and blue.

With the foregoing arrangement wherein a monochromatic color filter is formed in one light transmitting section, the accuracy required in forming the color filters may be lower than that in the conventional case. More specifically, in the case where a plurality of color filters are formed in one light transmitting section, as in the case of Tokukaihei 8-146346, each color filter has to be formed with high precision, but in the case of the aforementioned arrangement, if only the light transmitting sections are formed with high precision, the monochromatic color filters are easily formed in accordance with the size of the light transmitting sections. Consequently, the yield of the 3-D image display device is further improved.

Furthermore, the color filters outside the display element may not have as good heat resistance as that of the color filters provided inside the display element. Therefore, they may not be formed using high-performance materials. As a result, the cost of the color filters can be decreased, and the cost of the 3-D image display device can be further decreased as well.

The 3-D image display device of the present invention is further characterized in that, in the display element, regarding each color, a pixel group is provided at each position corresponding to the color filter of the color, the pixel group being composed of a plurality of pixels which are driven in response to an image signal corresponding to the color.

According to the aforementioned arrangement, the color filters provided outside the display element are formed so as to respectively correspond to the pixel groups each being composed of a plurality of pixels. Therefore, light outgoing from a certain pixel group in the display element surely passes through a color filter of a color to which the light correspond.

Here, in the case where color filters are provided inside the display element, the color filters are formed with respect to the pixels at a 1:1 ratio. However, in the aforementioned arrangement, each color filter is formed with respect to one pixel group composed of a plurality of pixels, and therefore, each color filter can be formed several times greater than the conventional color filter.

Therefore, even in the case where the pixel size of the display element is reduced, the color filters can be easily formed in the optical path controlling member. As a result, high resolution can be easily achieved in displaying 3-D images.

Furthermore, the 3-D image display device of the present invention is further characterized in that the plurality of pixels are a pair of a pixel driven in response to an image signal for an image directed to the right eye and a pixel driven in response to an image signal for an image directed to the left eye.

With the aforementioned arrangement, each pixel group is composed of a pair of a right-eye image display pixel and a left-eye image display pixel, whereby a so-called binocular 3-D image display device is realized. The right-eye image display pixel is driven in response to a right-eye image signal, while the left-eye image it display pixel is driven in response to a left-eye image signal.

In the case where the binocular 3-D image display device is thus provided, the resolution of 3-D images which the observer observes is ½, since parallax images are two in number. This is because, generally, in the case of a multi-view 3-D image display device, resolution is 1/n, if the number of parallax of the image display device is n.

Furthermore, the 3-D image display device of the present invention is characterized by further comprising (1) position detecting means for detecting a position of the observer, and (2) moving means for moving the optical path controlling member so that the optical path controlling member follows movement of the observer, based on the observer position information detected by the position detecting means.

With the aforementioned arrangement, the position of the observer is detected by the position detecting means. The optical path controlling member is moved by the moving means based on position information on the observer detected by the position detecting means. In other words, when the observer moves, the optical path controlling means is also moved, following the movement of the observer. Therefore, observation regions are expanded as compared with the case where the optical path controlling means is fixed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A three-dimensional image display device comprising:
   a display element for displaying an image; and
   an optical path controlling member having a plurality of light transmitting sections or apertures which transmit light which is in accordance with the image, said optical path controlling member controlling optical paths so that the light having passed through each light transmitting section reaches a right or left eye of an observer,
   wherein:
      said display element conducts monochromatic display; and
      said optical path controlling member is located outside said display element, and each light transmitting section of said optical path controlling member includes a color filter for selectively transmitting the light outgoing from said display element.

2. The three-dimensional image display device as set forth in claim 1, wherein each of said color filters corresponding to said light transmitting sections respectively has one color selected from among three principal colors of red, green, and blue.

3. The three-dimensional image display device as set forth in claim 2, wherein, in said display element, regarding each color, a pixel group is provided at each position corresponding to said color filter of the color, said pixel group being composed of a plurality of pixels which are driven in response to an image signal corresponding to the color.

4. The three-dimensional image display device as set forth in claim 3, wherein said plurality of pixels composing one pixel group respectively display images which have parallax with respect to each other.

5. The three-dimensional image display device as set forth in claim 3, wherein said plurality of pixels are a pair of a pixel driven in response to an image signal for an image directed to the right eye and a pixel driven in response to an image signal for an image directed to the left eye.

6. The three-dimensional image display device as set forth in claim 1, further comprising:
   position detecting means for detecting a position of the observer; and
   moving means for moving said optical path controlling member so that said optical path controlling member follows movement of the observer, based on the observer position information detected by said position detecting means.

7. The three-dimensional image display device as set forth in claim 1, wherein said display element is a liquid crystal display element.

8. The three-dimensional image display device as set forth in claim 1, wherein said optical path controlling member is a parallax barrier, said parallax barrier having apertures serving as said light transmitting sections, and light blocking members formed around said apertures.

9. The three-dimensional image display device as set forth in claim 8, wherein said color filters are formed so as to fill said apertures.

10. The three-dimensional image display device as set forth in claim 8, wherein said light blocking members are formed on end portions of said color filters formed in said light transmitting sections.

11. The three-dimensional image display device as set forth in claim 8, wherein said light blocking members are formed so as to cover end portions of said color filters formed in said light transmitting sections.

12. The three-dimensional image display device as set forth in claim 1, wherein said optical path controlling member is a lenticular lens composed of cylindrical lenses provided on a substrate, said cylindrical lenses serving as said light transmitting sections.

13. The three-dimensional image display device as set forth in claim 12, wherein said cylindrical lenses are provided on said substrate with said color filters of the predetermined colors therebetween.

14. The three-dimensional image display device as set forth in claim 13, wherein light blocking members are formed along boundaries of said color filters neighboring to each other.

15. The three-dimensional image display device as set forth in claim 12, wherein, regarding each color, said color filters of the color are formed on surfaces of said cylindrical lenses corresponding to the color, said surfaces of said cylindrical lenses being opposite to surfaces thereof in contact with said substrate.

16. The three-dimensional image display device as set forth in claim 12, wherein, regarding each color, each cylindrical lens corresponding to the color is colored in the color, so as to serve as said color filter of the color.

17. The image display device of claim 1, wherein said optical path controller member comprises a parallax barrier including a plurality of apertures therein, and wherein color filters are provided in respective apertures; and
   wherein said parallax barrier is positioned on a side of said display element closest to a viewer, and wherein said display element includes a liquid crystal display.

18. A three-dimensional image display device comprising:
   a display device for displaying an image; and
   an optical path controlling member including a parallax barrier located on an observer or viewer side of said display device so that the parallax barrier is not located between polarizers of the display device, said optical path controlling member including a plurality of light transmitting sections which transmit light in accordance with the image, said optical path controlling member controlling optical paths so that light having passed through each light transmitting section reaches a right or left eye of an observer, wherein:
said display element conducts monochromatic display; and a plurality of said light transmitting sections of said optical path controlling member each include a color filter for selectively transmitting the light output from said display element, so that the optical path controlling member comprises said color filters which are located outside said display device.

19. The image display device of claim 1, wherein the display element includes first and second polarizers between which a liquid crystal layer is provided; and wherein said optical path controlling member is not located between said polarizers.

20. The image display device of claim 1, wherein said optical path controlling member is located outside of and in contact with said display element.

* * * * *